US007155779B2

(12) United States Patent
Watkins

(10) Patent No.: US 7,155,779 B2
(45) Date of Patent: Jan. 2, 2007

(54) AUTOMATIC LIFT AND TURN HINGE AND GATE

(75) Inventor: Guy Watkins, Baton Rouge, LA (US)

(73) Assignee: Logical Decisions, Inc., Baton Rouge, LA (US)

( * ) Notice: Subject to any disclaimer, the term of this patent is extended or adjusted under 35 U.S.C. 154(b) by 14 days.

(21) Appl. No.: 10/906,429

(22) Filed: Feb. 18, 2005

(65) Prior Publication Data

US 2005/0183240 A1 Aug. 25, 2005

Related U.S. Application Data

(60) Provisional application No. 60/546,517, filed on Feb. 19, 2004.

(51) Int. Cl.
*B29C 35/00* (2006.01)
*E05F 1/02* (2006.01)

(52) U.S. Cl. ............................ 16/316; 16/86.2; 49/399

(58) Field of Classification Search ................. 16/86.1, 16/86.2, 310, 316, 235, 248, 309, 312, 389, 16/231; 160/199, 196.1; 49/381, 371, 208, 49/254, 237, 239, 399; 403/109.5, 295, 119, 403/350

See application file for complete search history.

(56) References Cited

U.S. PATENT DOCUMENTS

| | | | | |
|---|---|---|---|---|
| 2,883,183 | A | 4/1959 | Finsterwalder | |
| 3,292,204 | A * | 12/1966 | Tansey | 16/263 |
| 3,733,650 | A * | 5/1973 | Douglas | 16/312 |
| 3,829,826 | A | 8/1974 | Brown et al. | |
| 4,124,955 | A * | 11/1978 | Kochis | 49/237 |
| 4,231,190 | A | 11/1980 | Tieben | |
| 4,270,312 | A | 6/1981 | Courtis | |
| 4,391,020 | A * | 7/1983 | Hsu | 16/314 |
| 4,403,449 | A | 9/1983 | Richmond | |
| 4,406,034 | A * | 9/1983 | Lindemann | 16/284 |
| 4,472,908 | A | 9/1984 | Wanzl | |
| 4,490,941 | A | 1/1985 | Mamach | |
| 4,494,275 | A * | 1/1985 | Hsi-Shan | 16/314 |
| 4,665,650 | A | 5/1987 | Hall | |
| 4,697,306 | A * | 10/1987 | Rhodes | 16/317 |
| 4,864,691 | A * | 9/1989 | Gidseg et al. | 16/312 |
| 4,991,259 | A * | 2/1991 | Finkelstein et al. | 16/312 |
| 5,133,152 | A * | 7/1992 | Grancagnolo | 49/239 |
| 5,265,311 | A * | 11/1993 | Gard | 16/312 |
| 6,629,334 | B1 * | 10/2003 | Huang | 16/50 |
| 6,928,699 | B1 * | 8/2005 | Sawa | 16/312 |
| 6,935,000 | B1 * | 8/2005 | Arnaud | 16/239 |
| 7,013,531 | B1 * | 3/2006 | Jackson | 16/309 |
| 2002/0116788 | A1 * | 8/2002 | Pompei | 16/315 |

* cited by examiner

*Primary Examiner*—Katherine Mitchell
*Assistant Examiner*—André L. Jackson
(74) *Attorney, Agent, or Firm*—Roy, Keisel et al.

(57) ABSTRACT

An automatic hinge having an upper or left hand section with an arcuate interior or lower edge, a central section with an arcuate left hand or upper edge and an arcuate right hand or lower edge, and a lower or right hand section with an upper or interior edge. The sections are preferably cylindrical and the edges generally elliptical. A drive moves the central section linearly between the upper and lower sections. As the central and upper sections engage, the central section will rotate in one direction. As the central section engages the lower section, the central section will rotate in the opposite direction. A gate is preferably attached to the central section. By linearly moving the central section, the gate is lifted and turned. The preferred configuration allows the hinge to open a gate inward or outward in both a left hand mount and a right hand mount.

16 Claims, 32 Drawing Sheets

AUTOMATIC LIFT AND TURN HINGE AND GATE

PRIORITY CLAIM

This application claims priority of, and hereby incorporates by reference in its entirety, U.S. Provisional Application No. 60/546,517, filed Feb. 19, 2004.

BACKGROUND OF THE INVENTION

1. Field of the Invention

The invention relates to swinging closing devices in general and to automatic gates in particular.

2. Prior Art

Automatic gates are known in the prior art. In one common type of automatic gate, the gate is mounted on a track. Upon activation, the gate is retracted along the track. This can pose a problem in that the terrain around the gate may not be flat. Where the gate is placed over a road or driveway, it will generally be desirable for the gate to fit flush against the road to prevent access to the secured property beneath the gate. If the terrain immediately surrounding the gate is uneven and particularly if it is upwardly inclined as is often the case in mountainous regions, retraction of the gate will be difficult if not impossible, unless the gate itself can flex, which can potentially compromise the integrity of the gate as a security device as well as provide an additional potential failure point in the gate retraction mechanism.

Similar problems face swinging gates in uneven terrain. Frequently, the road or drive may rise in front of or behind a gate. As the gate swings out to open, it may encounter the rising drive, preventing it from opening fully. The problem can be addressed by simply raising the gate; however, this solution present its own set of problems in that the raised gate will no longer be in contact with the road or drive. This could allow intruders in or livestock out of the secured property.

Gates that simultaneously lift and turn are known in the prior art as well. However, the rotational mechanisms for such gates are often limited to a particular application. A single gate system typically cannot be used to open both left hinged and right hinged gates. Nor can typical prior art lift and turn gates utilize a single mechanism for both inward and outward opening gates. The result is that most prior art lift and turn gates must be custom designed for each application. Accordingly, an automatic gate meeting the following objectives is desired.

Objects of the Invention

It is an object of the invention to provide an automatic gate that can be simultaneously lifted and opened.

It is another object of the invention to provide an automatic gate that can be used in environments whose topography is not flat.

It is still another object of the invention to provide an automatic gate that can be used to block roads and drives that rise proximately to the gate.

It is still another object of the invention to provide an automatic gate mechanism that can be used with left hinged and right hinged gates.

It is yet another object of the invention to provide an automatic gate mechanism that can be used with inward and outward opening gates.

Summary of the Invention

The preferred embodiment of the invention comprises an automatic gate hinge. In the preferred embodiment, the hinge comprises three sections: an upper section, a central section and a lower section. The upper section and lower sections are preferably fixed in place, while the central section is free to rotate with respect to either other section. A gate is operatively attached to the central section such that when the central section rises or falls, the gate rises or falls. Similarly, the gate is configured to swing as the central section turns.

The facing edge of the sections are curved and configured to mate. Initially, the central section will rest on the lower section. An outside power source will lift the central section into contact with the upper section. As the central section continues to rise, the interaction between the edges of the central section and the upper section will cause the central section to rotate such that the central section will simultaneously rise and rotate. The attached gate will follow suit.

As the central section is lowered, the interaction between the edges of the central section and the lower section will cause the lower section to fall and rotate simultaneously. A vertical section is provided in the lower edge of the central section and in the upper edge of the lower section to keep the central and lower sections in contact continuously. This allows the central section to begin to rotate as soon as it begins to fall and it allows the central section to fall vertically after its rotation is complete. Thus, the gate may be lifted, simultaneously lifted and rotated, simultaneously lowered and rotated, and then lowered.

DETAILED DESCRIPTION OF THE PREFERRED EMBODIMENT

Figure 1A:
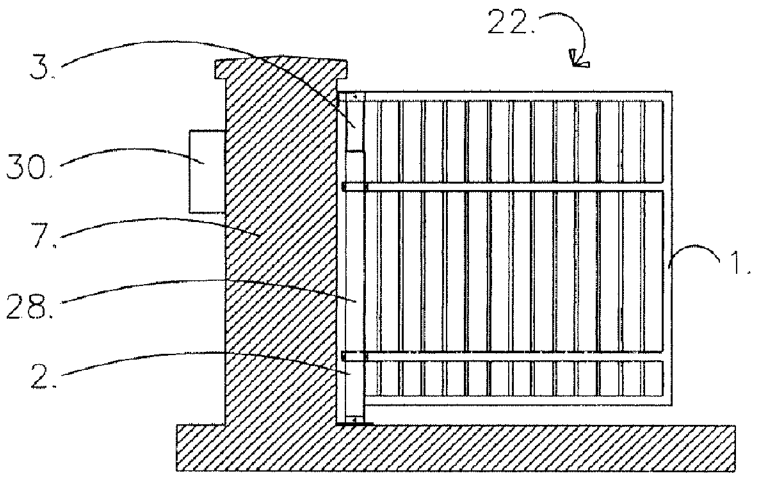
FIG. 1A is a side view of a gate in the closed position.
Figure 1B:
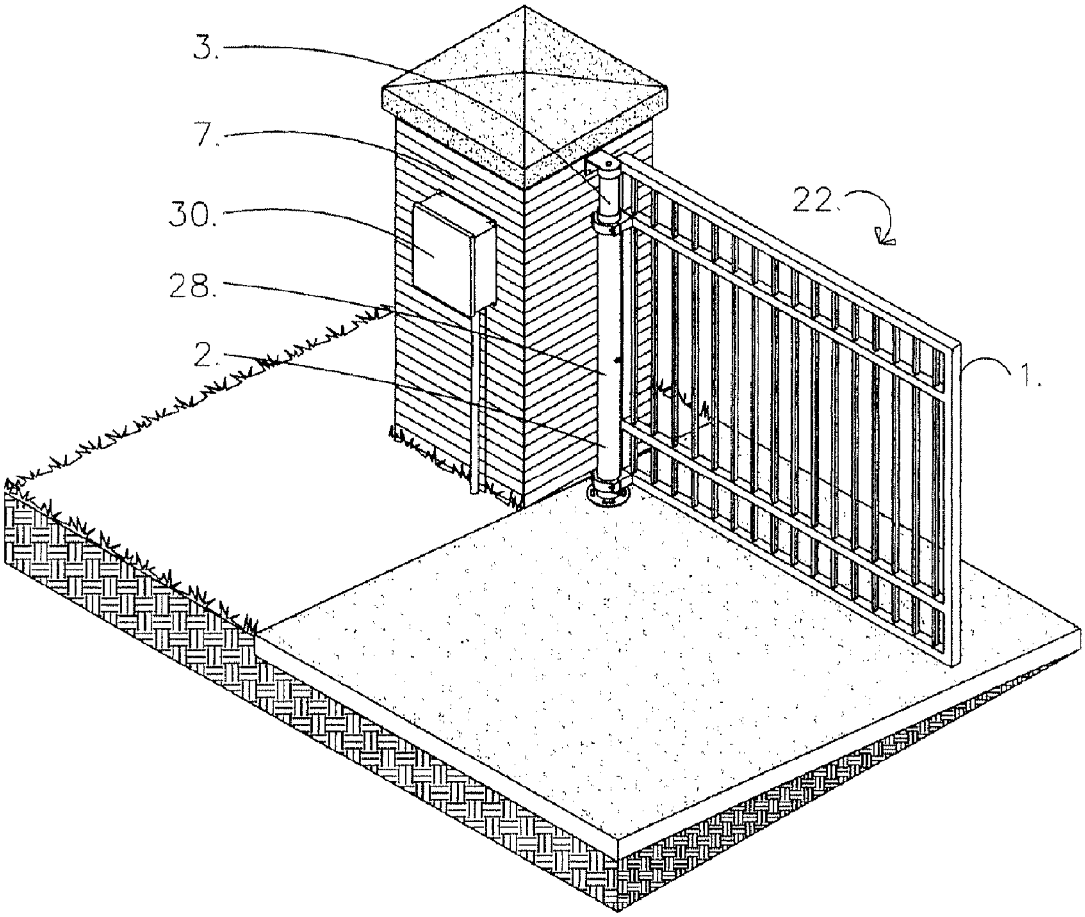
FIG. 1B is a perspective view of a gate in the closed position.
Figure 2A:
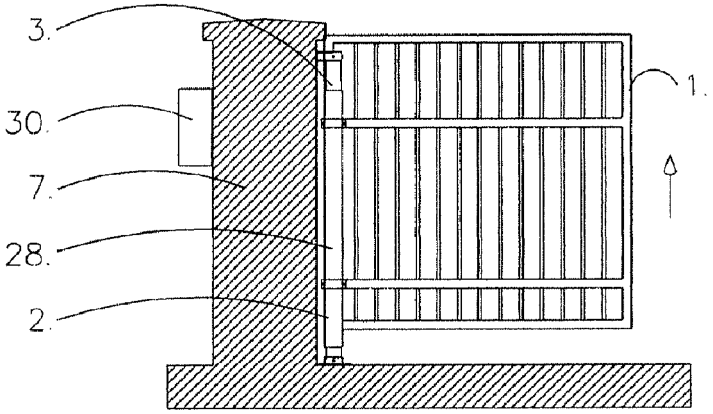
FIG. 2A is side view of a gate lifting vertically out of the closed position.
Figure 2B:
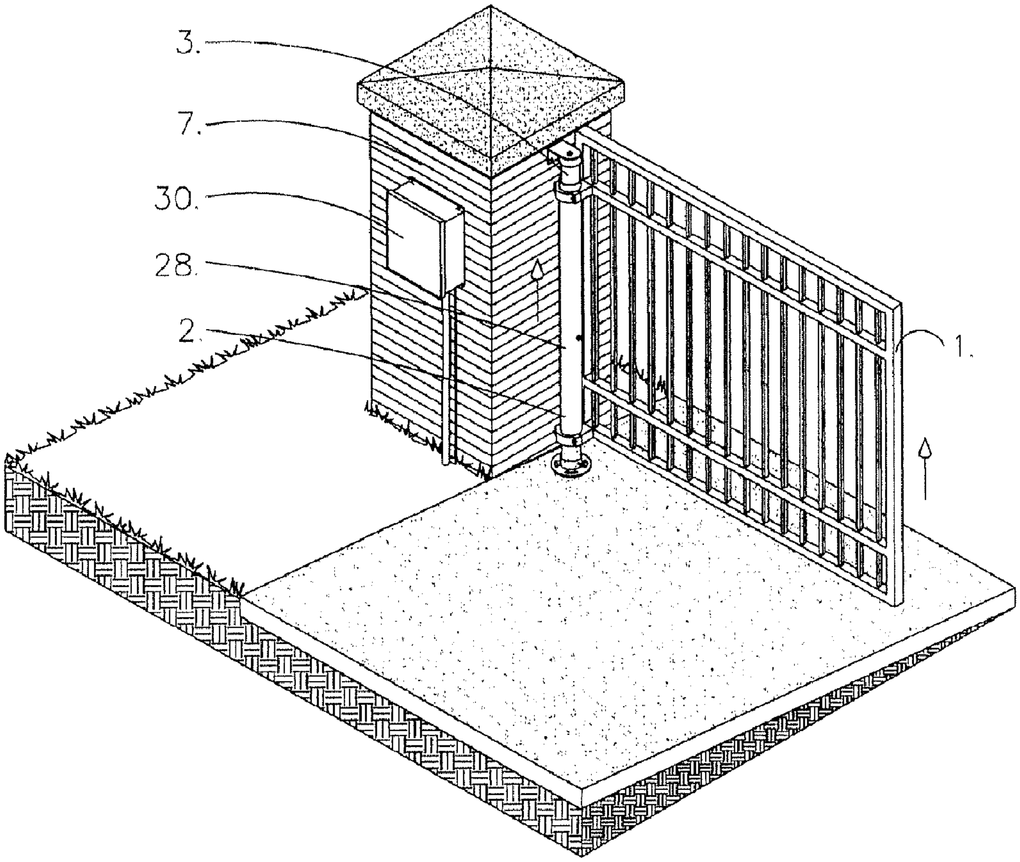
FIG. 2B is perspective view of a gate lifting vertically out of the closed position.
Figure 3A:
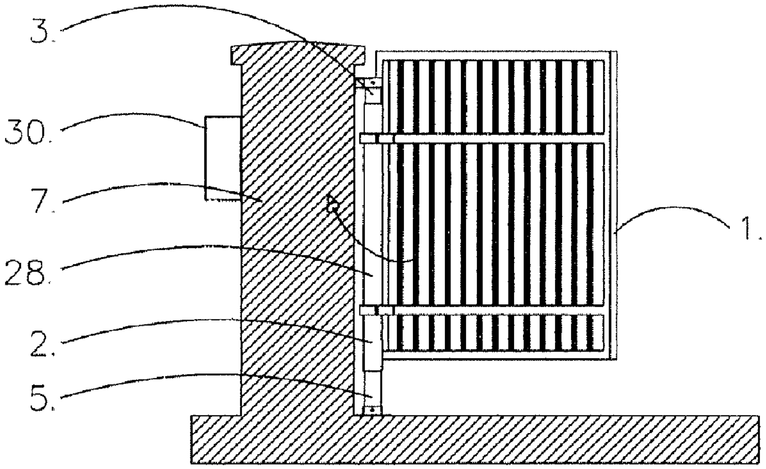
FIG. 3A is a side view of a gate illustrating the simultaneous lift and turn motion of the gate as it is opened.
Figure 3B:
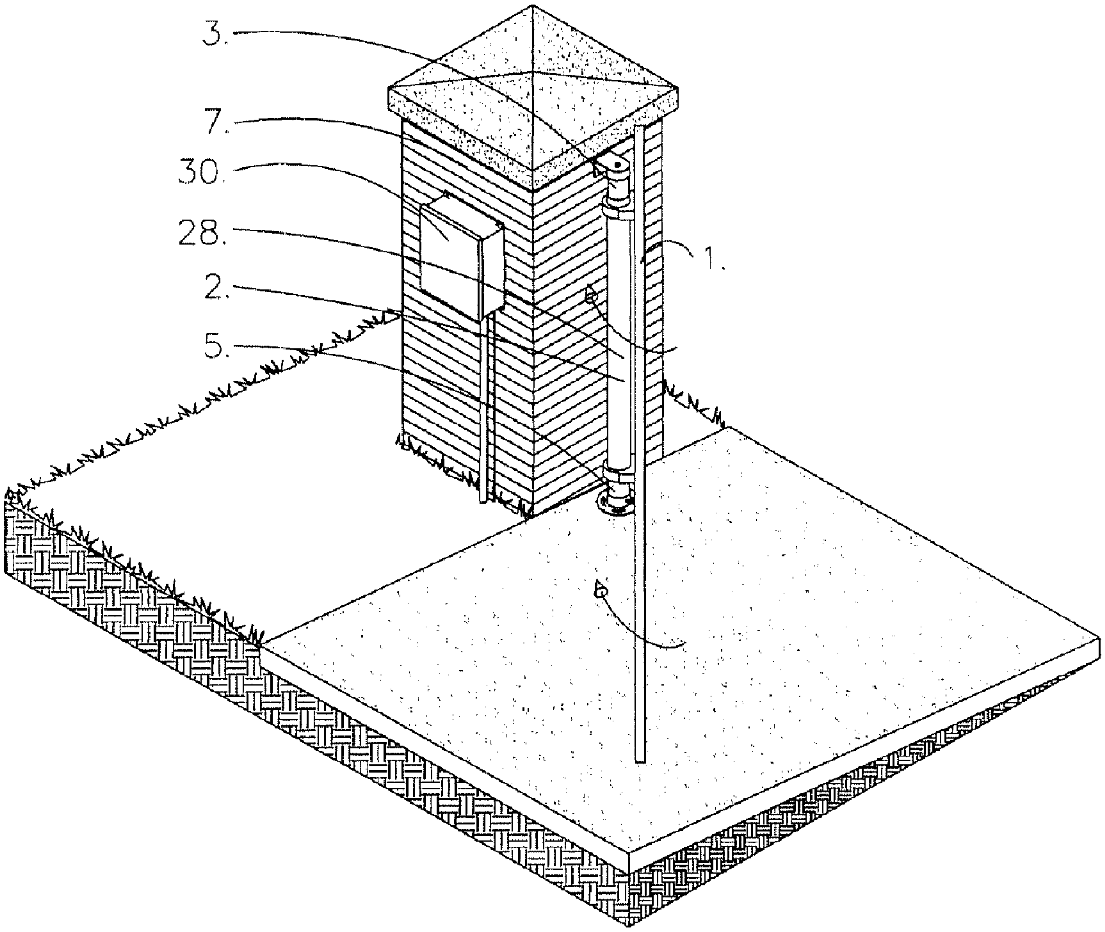
FIG. 3B is a perspective view of a gate illustrating the simultaneous lift and turn motion of the gate as it is opened.
Figure 4A:
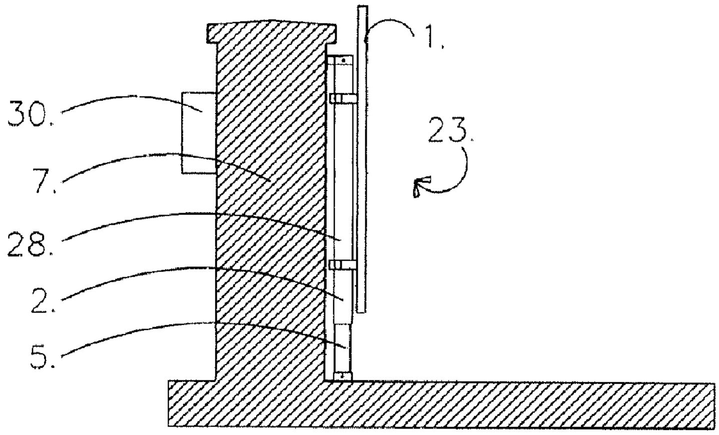
FIG. 4A is a side view of a gate in the open position.
Figure 4B:
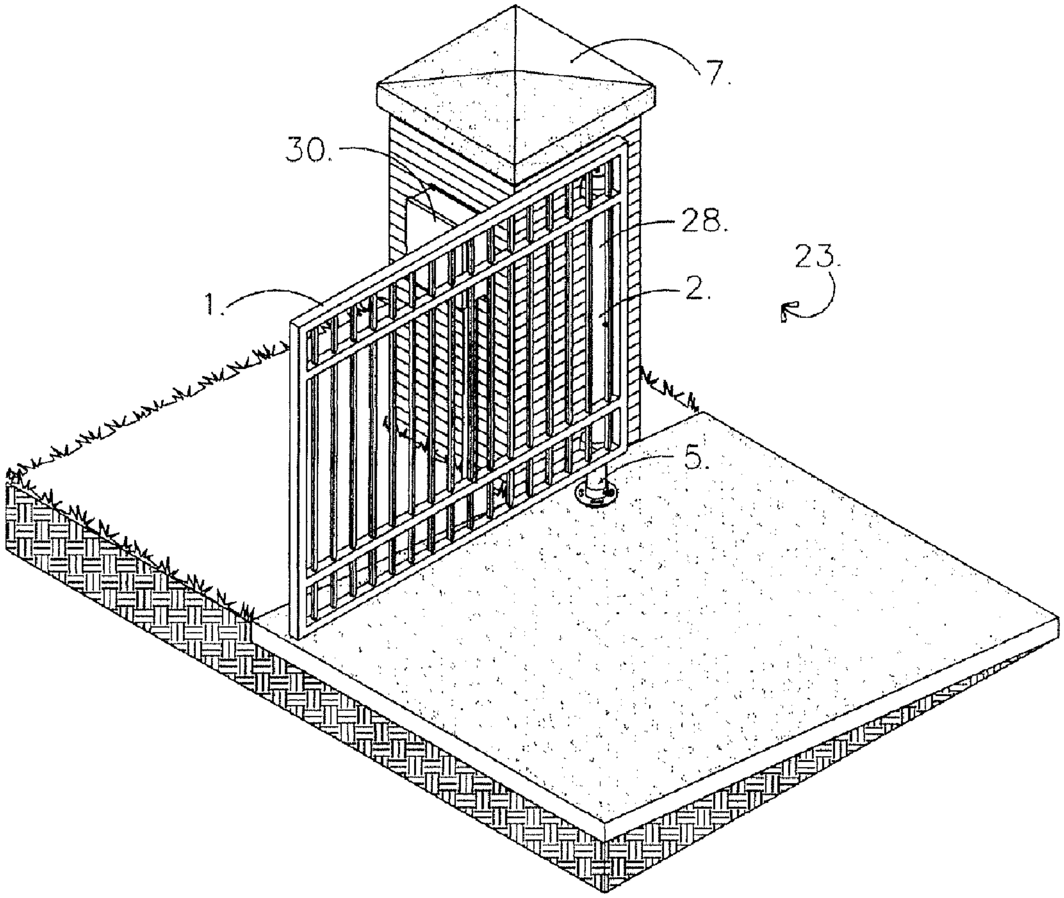
FIG. 4B is a perspective view of a gate in the open position.
Figure 5A:
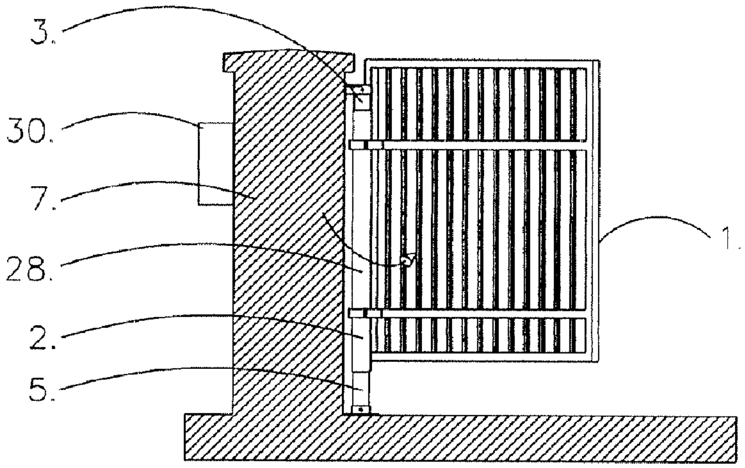
FIG. 5A is a side view of a gate illustrating the simultaneous descend and turn motion of the gate as it is closed.
Figure 5B:
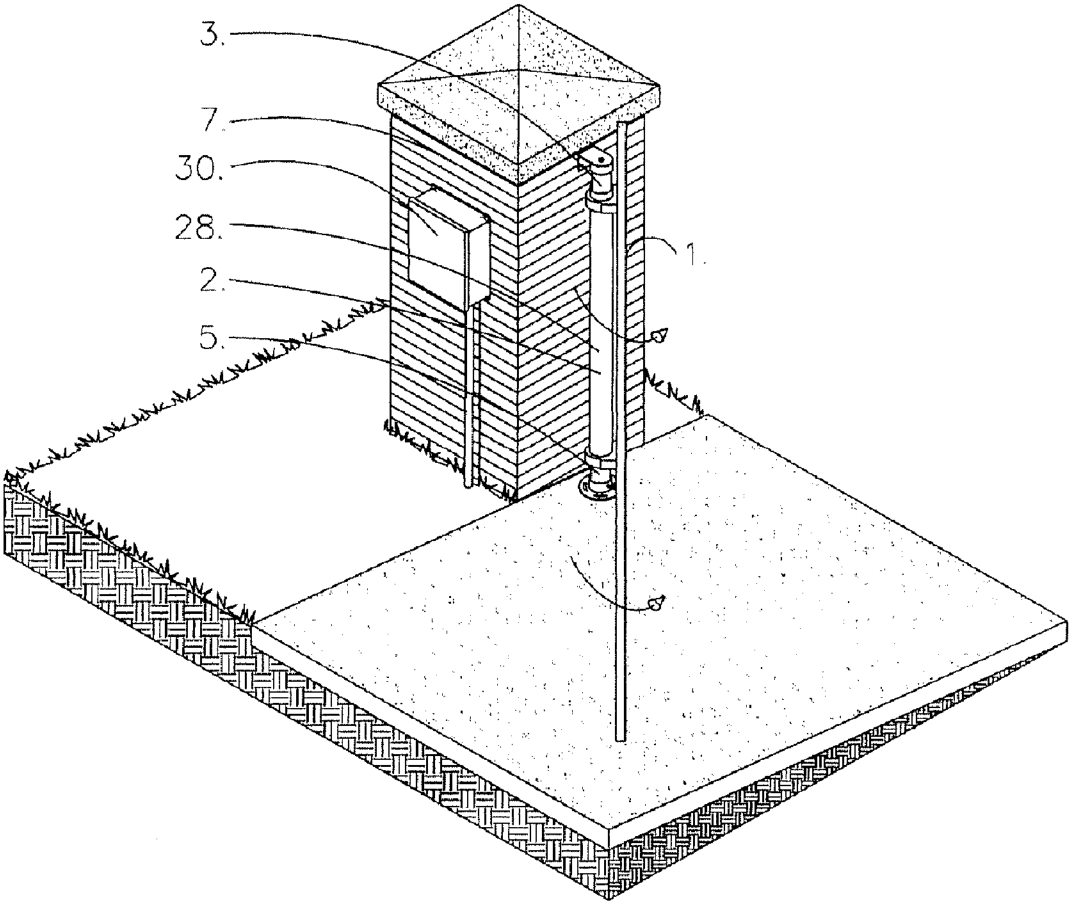
FIG. 5B is a perspective view of a gate illustrating the simultaneous descend and turn motion of the gate as it is closed.
Figure 6A:
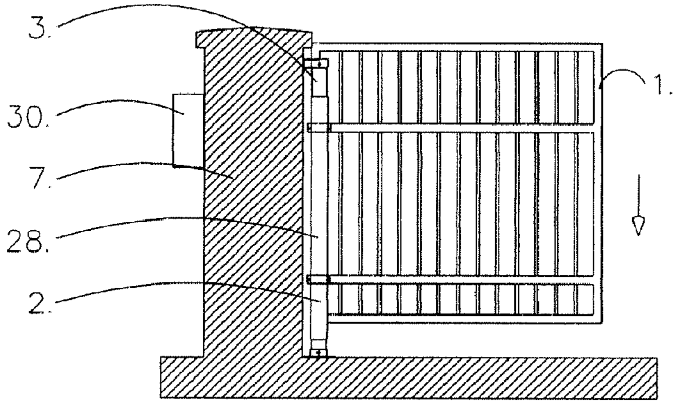
FIG. 6A is side view of a gate descending vertically back into the closed position.
Figure 6B:
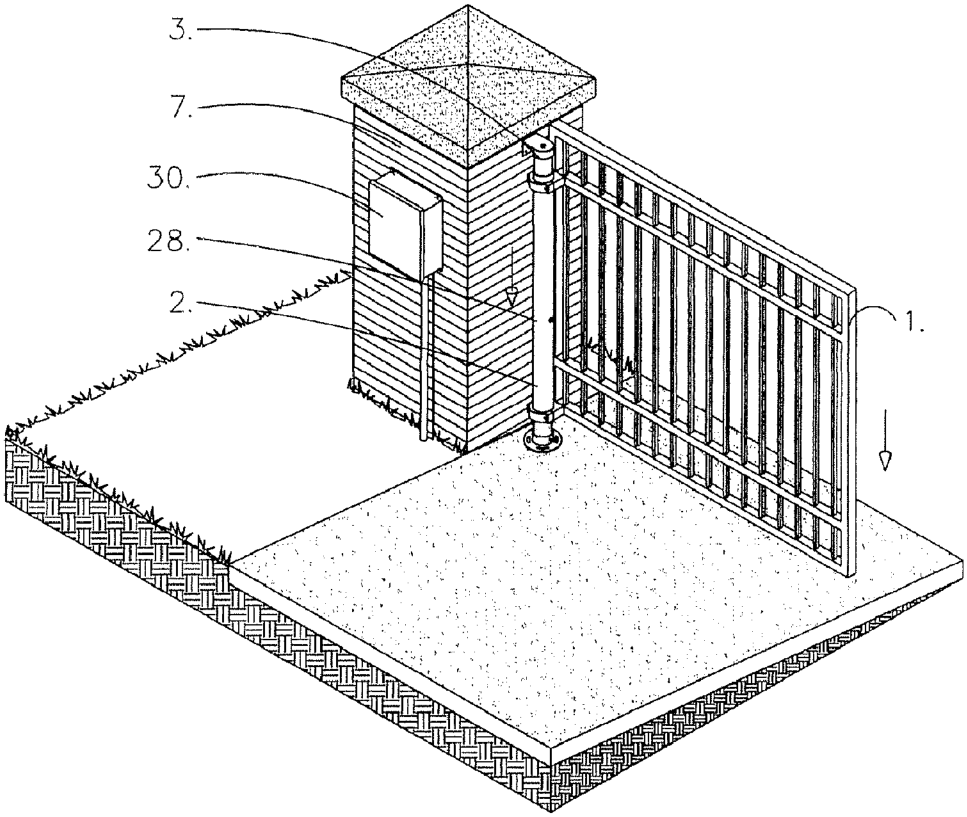
FIG. 6B is perspective view of a gate descending vertically back into the closed position.
Figure 7A:
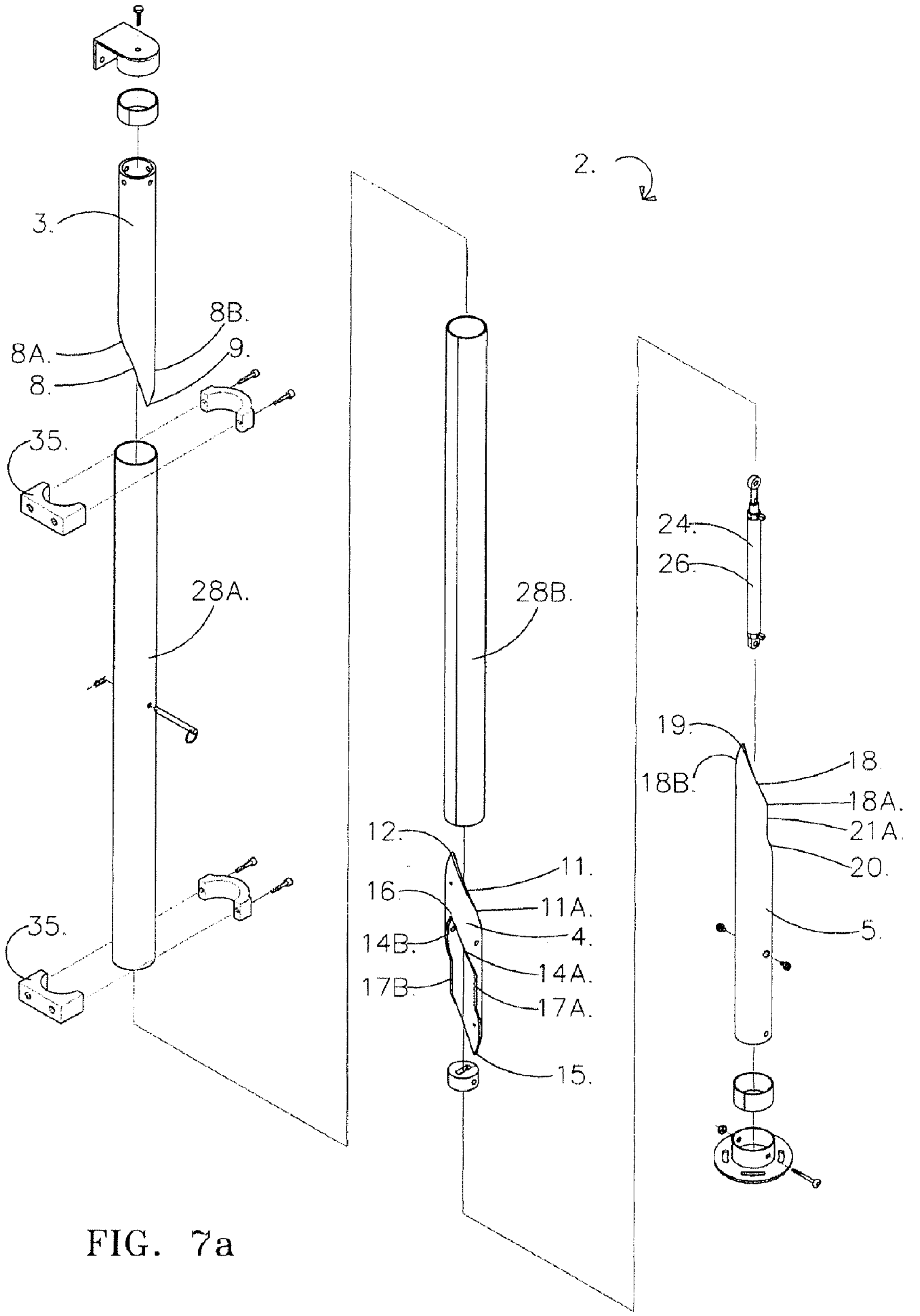
FIG. 7A is an exploded view of a preferred embodiment of a hinge illustrating the lower section, the central section, upper section, sleeve, and hydraulic lift.
Figure 7B:
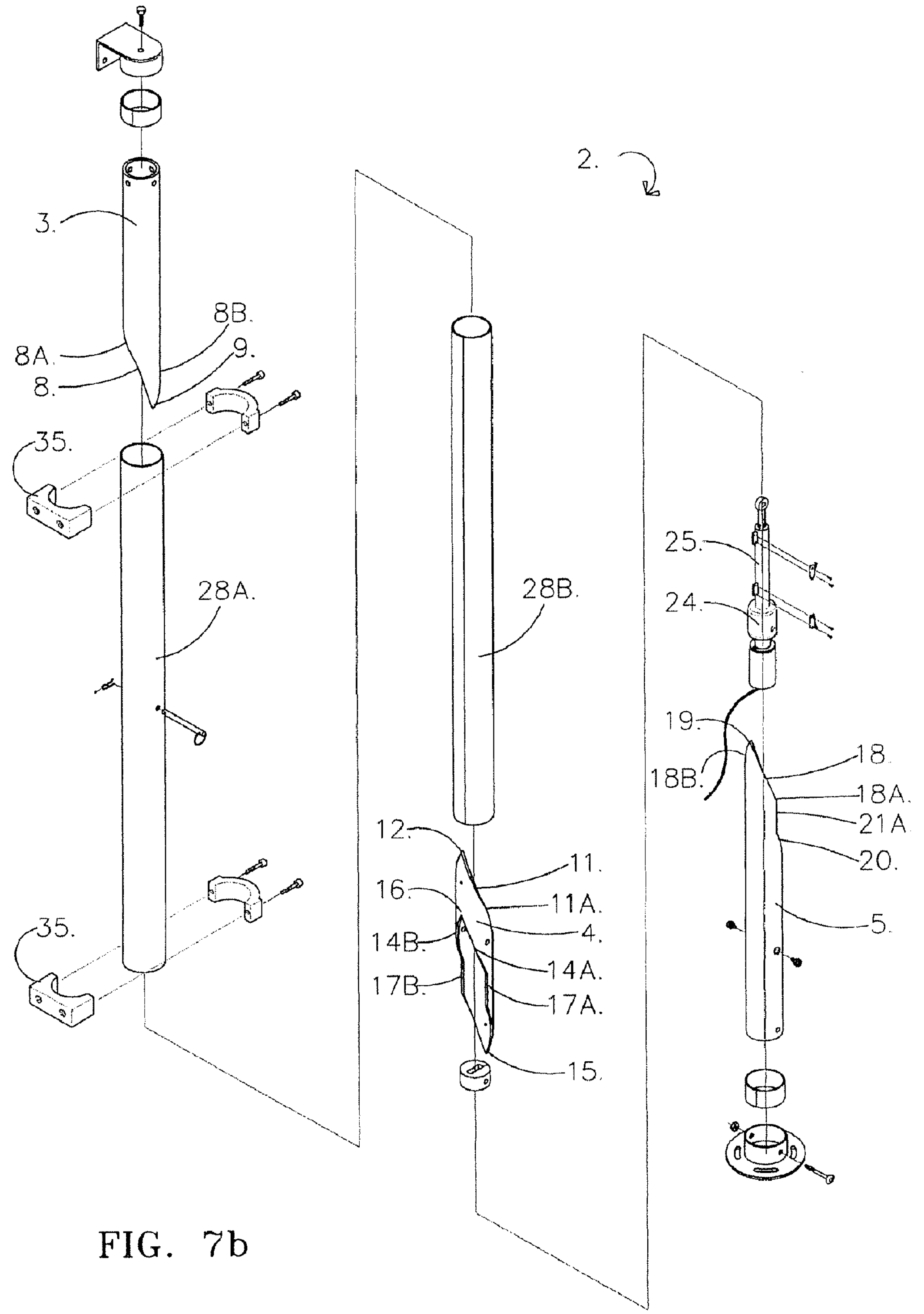
FIG. 7B is an exploded view of a preferred embodiment of a hinge illustrating the lower section, the central section, upper section, sleeve, and ball screw actuator lift.
Figure 8A:
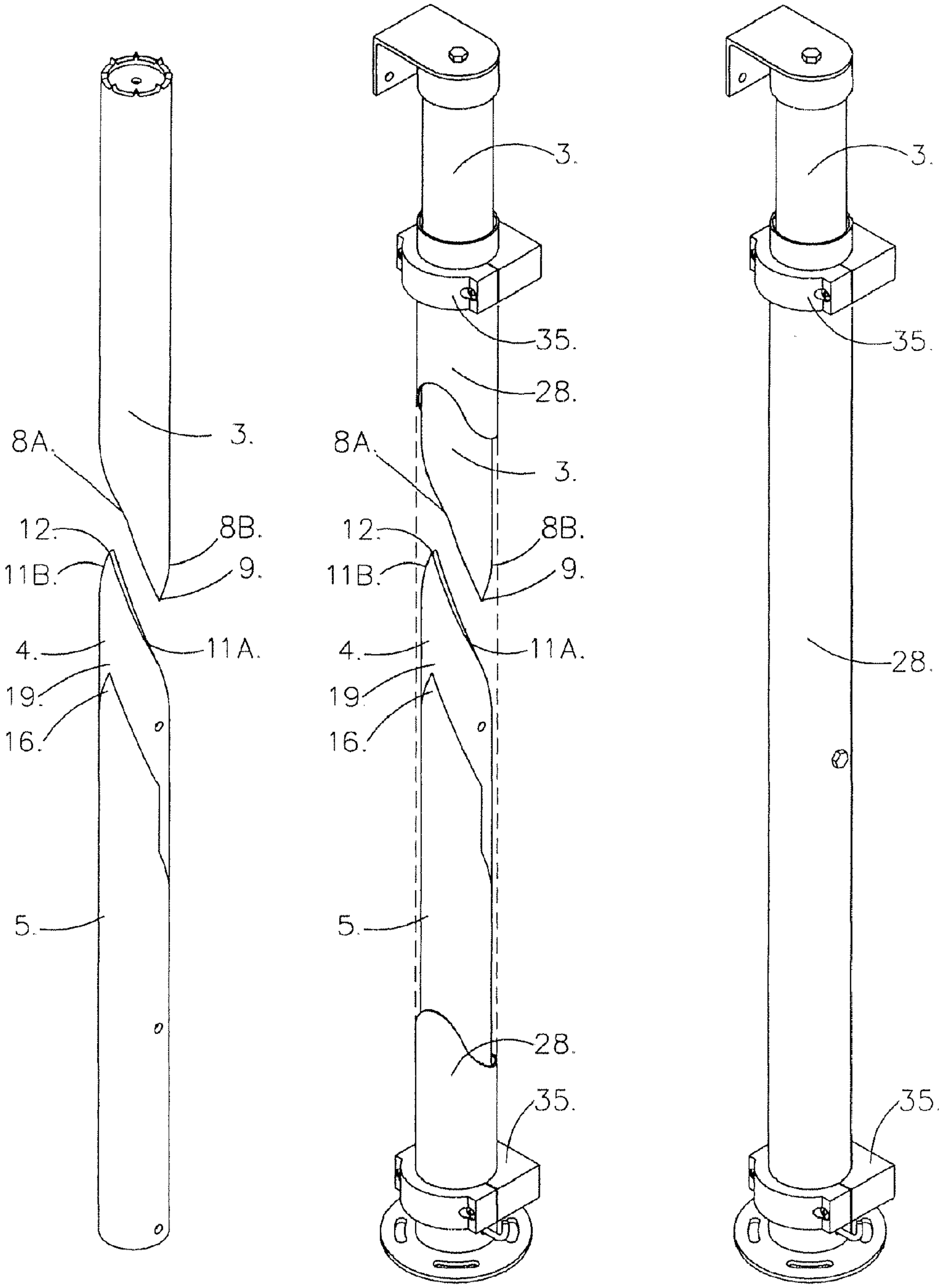
FIG. 8A is a perspective view illustrating a preferred embodiment of a left hand mount inward opening hinge in the closed position. The hinge is shown first without a sleeve, then with the sleeve shown cut-away, and finally with the sleeve intact.
Figure 8B:
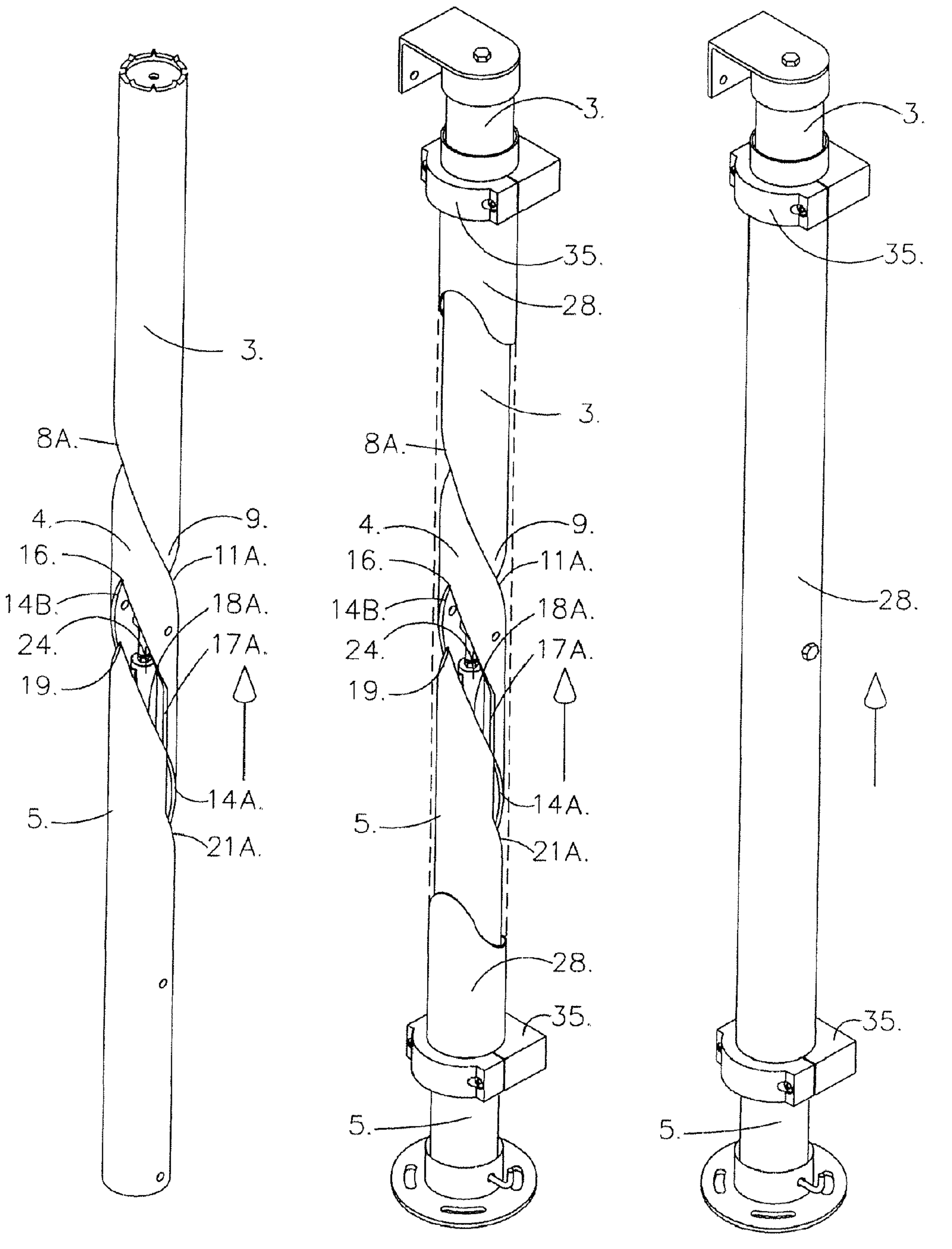
FIG. 8B is a perspective view illustrating a preferred embodiment of a left hand mount inward opening hinge rising vertically out of the closed position. The hinge is shown first without a sleeve, then with the sleeve shown cut-away, and finally with the sleeve intact.
Figure 8C:
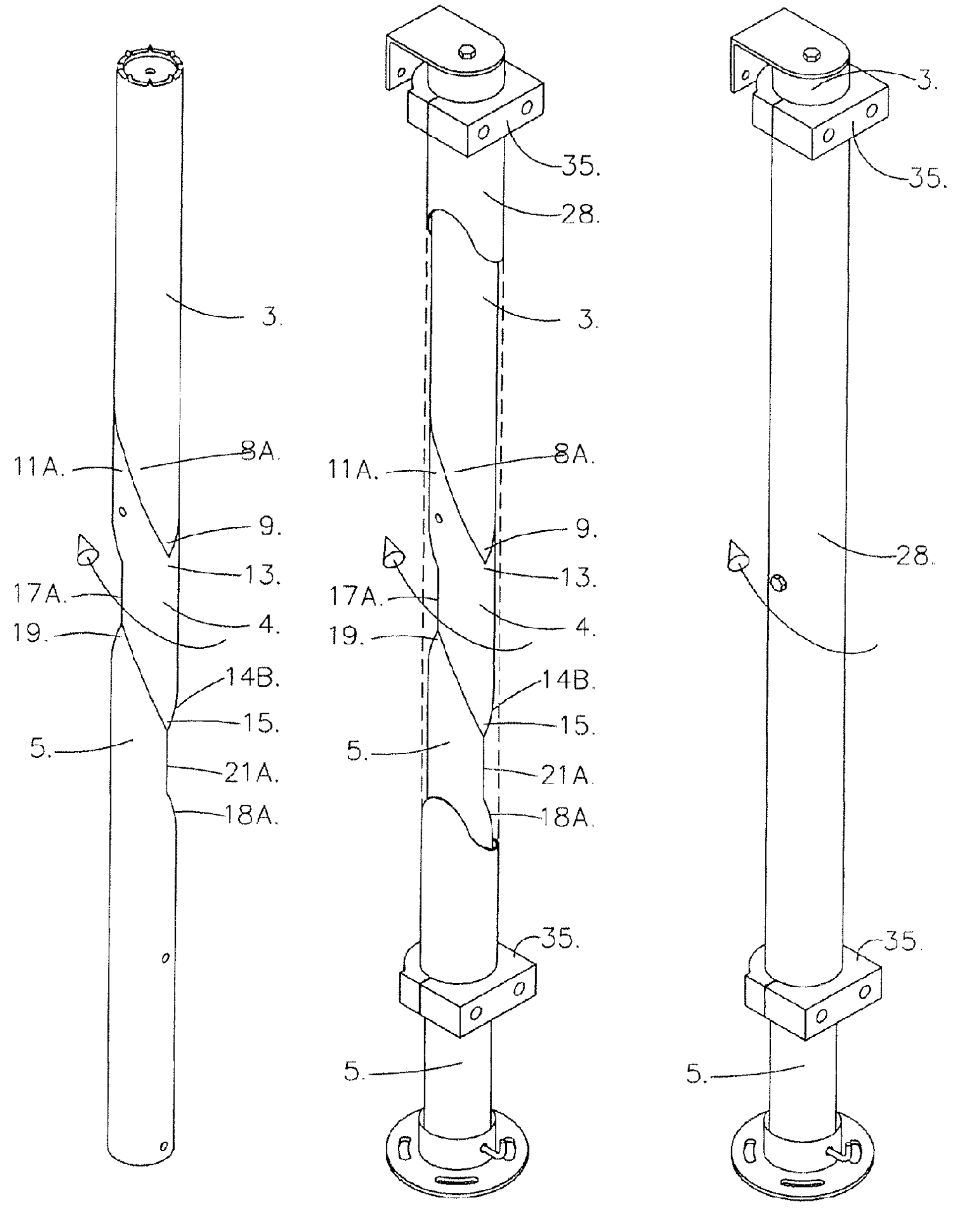
FIG. 8C is a perspective view illustrating a preferred embodiment of a left hand mount inward opening hinge simultaneously rising and turning as the hinge opens. The hinge is shown first without a sleeve, then with the sleeve shown cut-away, and finally with the sleeve intact.
Figure 8D:
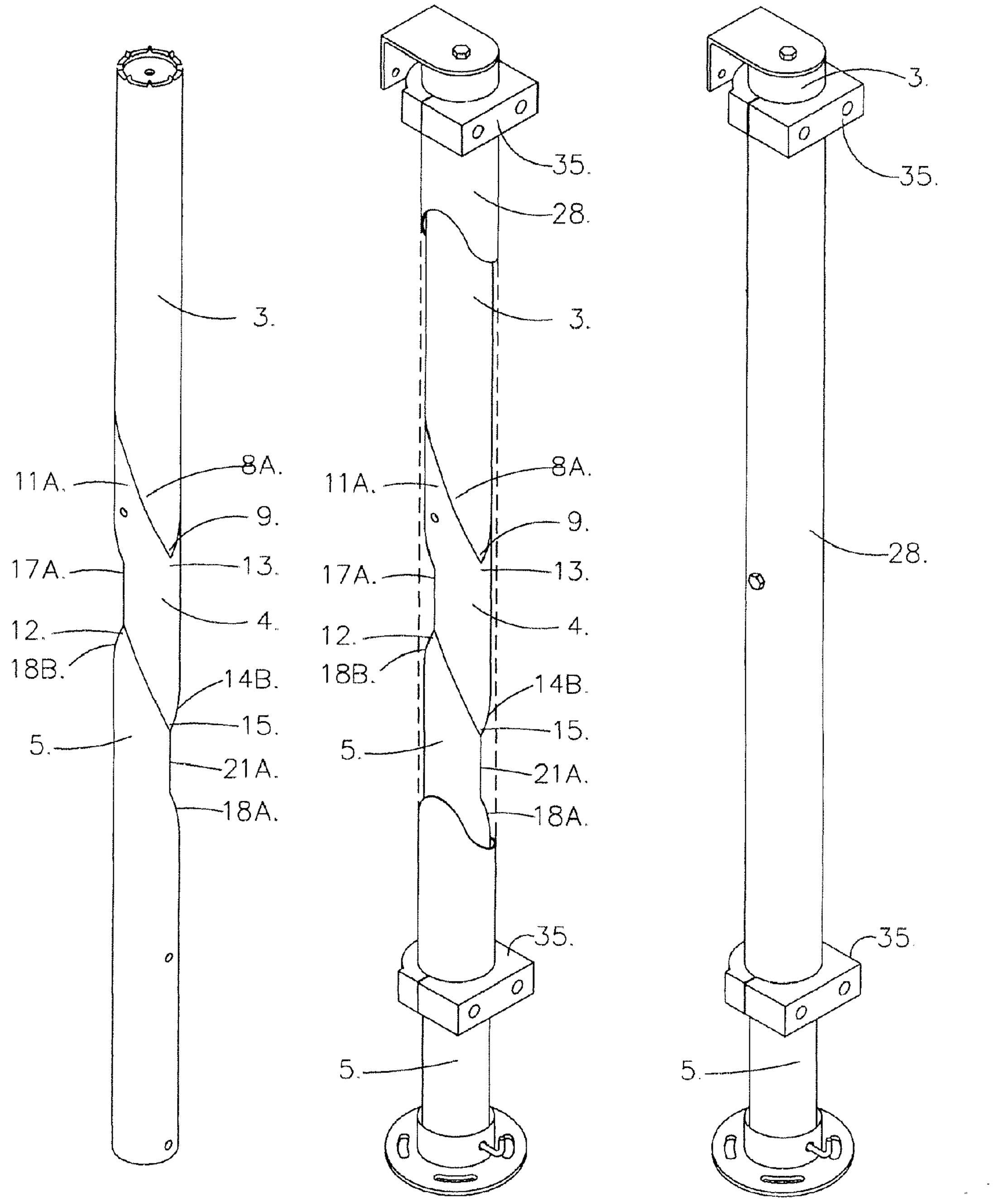
FIG. 8D is a perspective view illustrating a preferred embodiment of a left hand mount inward opening hinge in the open position. The hinge is shown first without a sleeve, then with the sleeve shown cut-away, and finally with the sleeve intact.
Figure 8E:
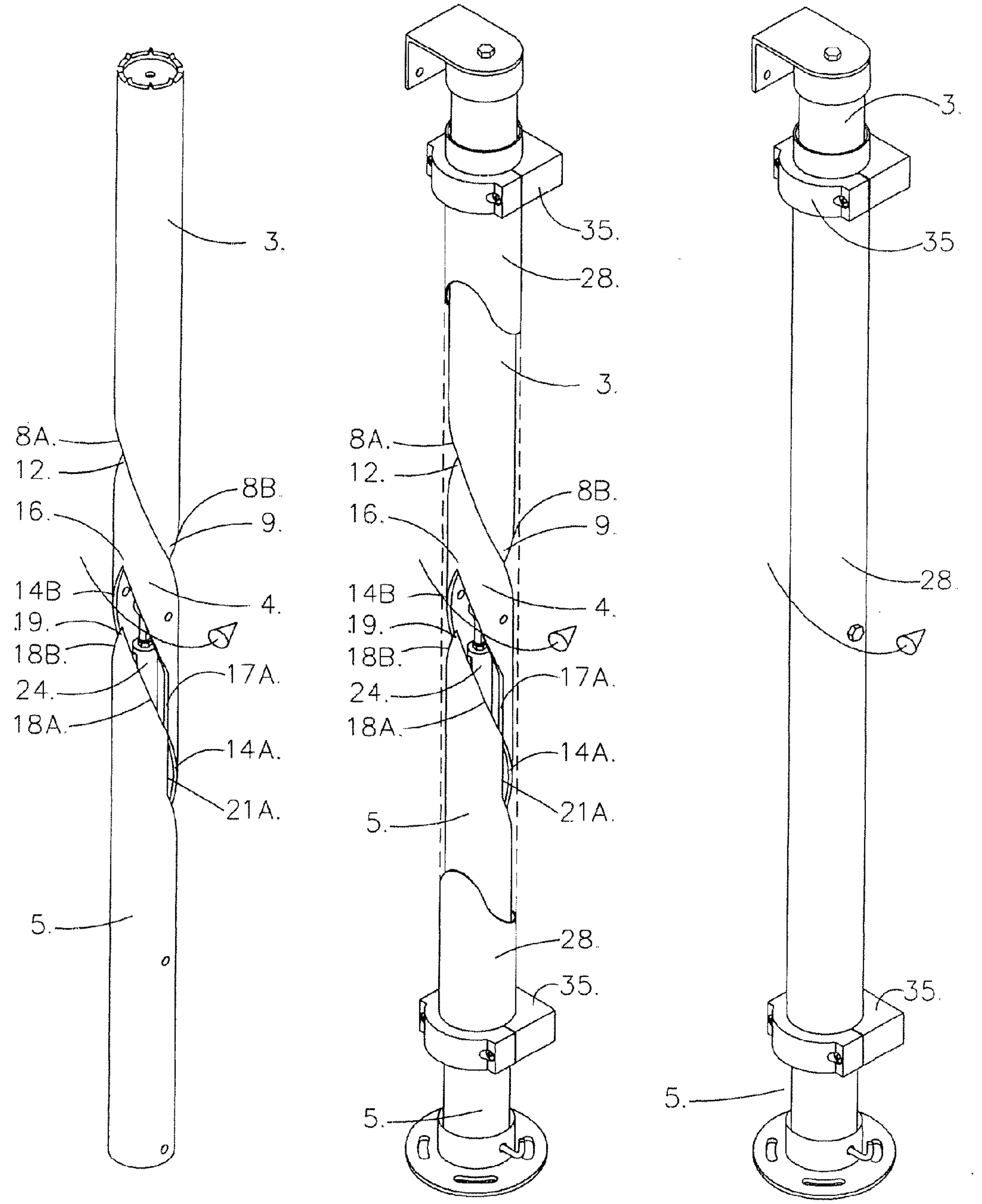
FIG. 8E is a perspective view illustrating a preferred embodiment of a left hand mount inward opening hinge simultaneously descending and turning as the hinge closes. The hinge is shown first without a sleeve, then with the sleeve shown cut-away, and finally with the sleeve intact.
Figure 8F:
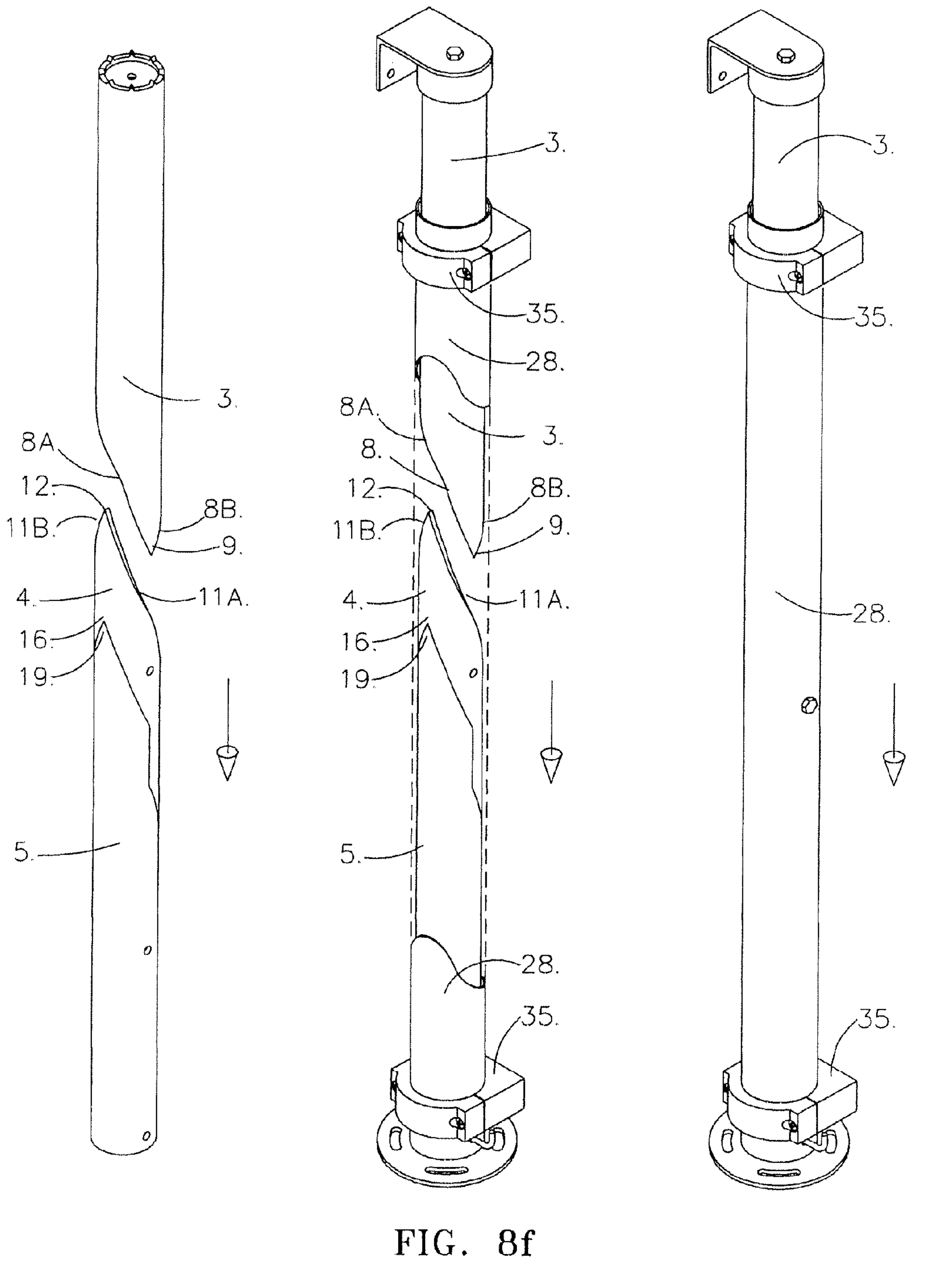
FIG. 8F is a perspective view illustrating a preferred embodiment of a left hand mount inward opening hinge descending back into the closed position. The hinge is shown first without a sleeve, then with the sleeve shown cut-away, and finally with the sleeve intact.
Figure 9A:
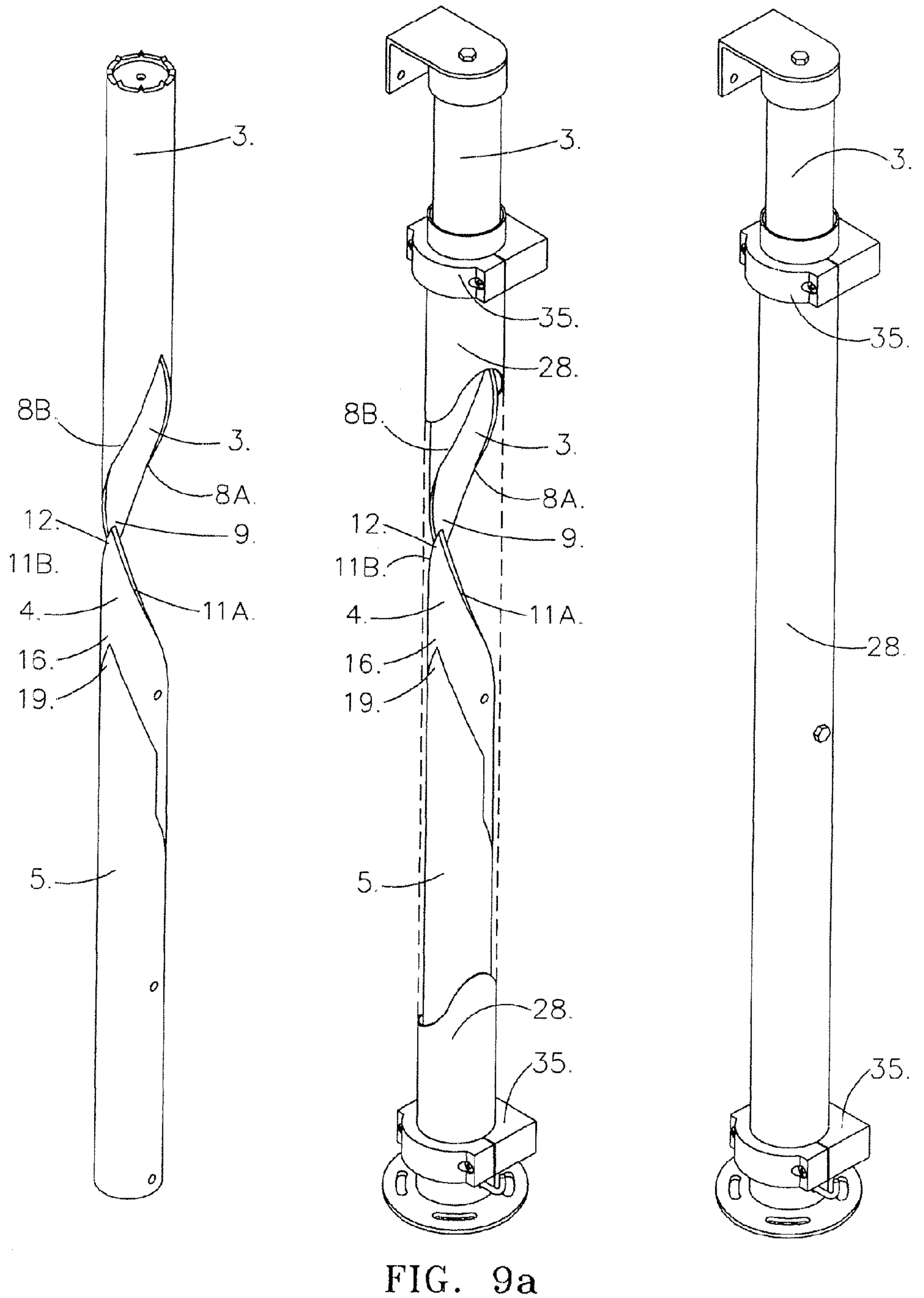
FIG. 9A is a perspective view illustrating a preferred embodiment of a left hand mount outward opening hinge in the closed position. The hinge is shown first without a sleeve, then with the sleeve shown cut-away, and finally with the sleeve intact.
Figure 9B:
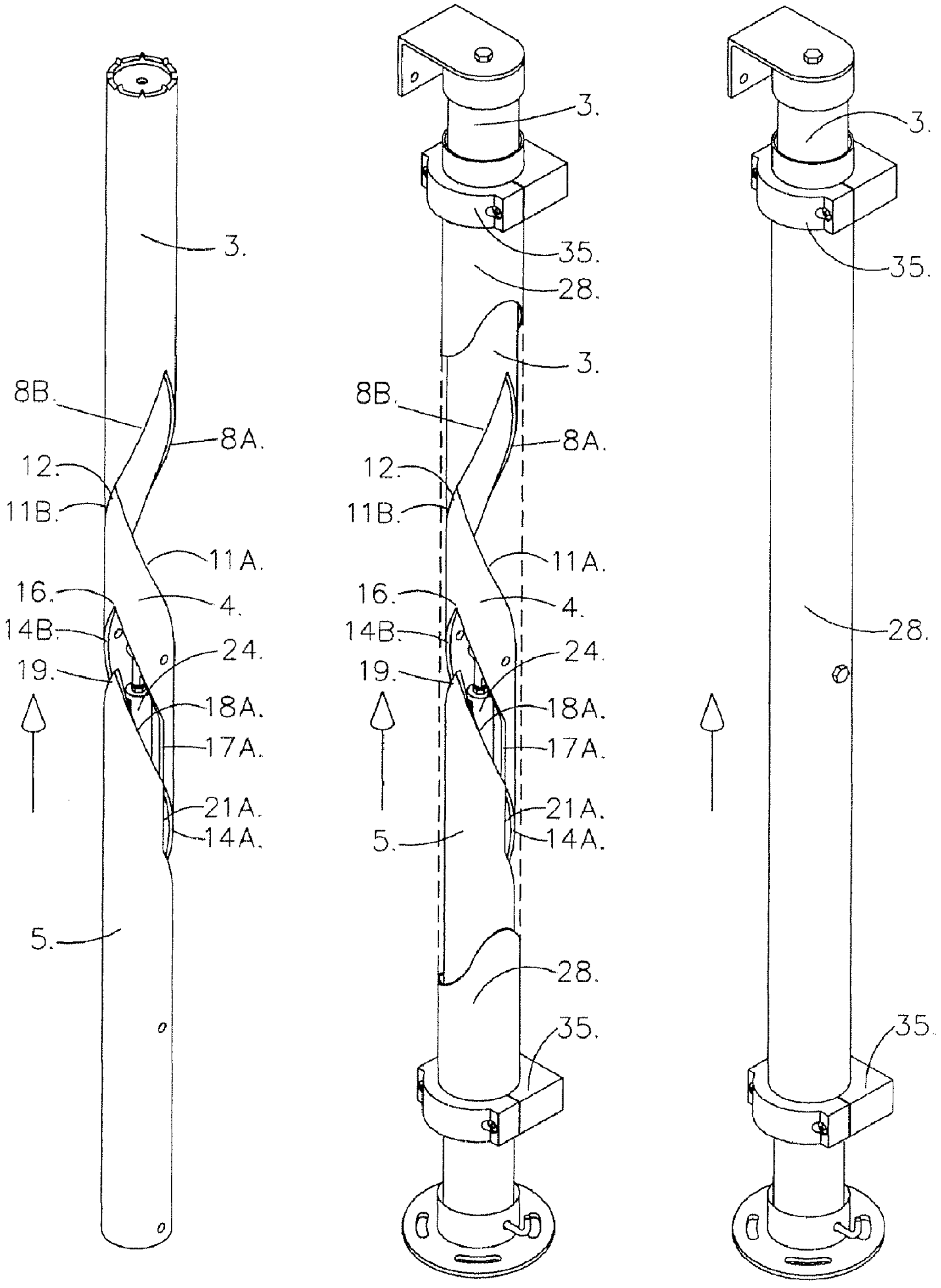
FIG. 9B is a perspective view illustrating a preferred embodiment of a left hand mount outward opening hinge rising vertically out of the closed position. The hinge is shown first without a sleeve, then with the sleeve shown cut-away, and finally with the sleeve intact.
Figure 9C:
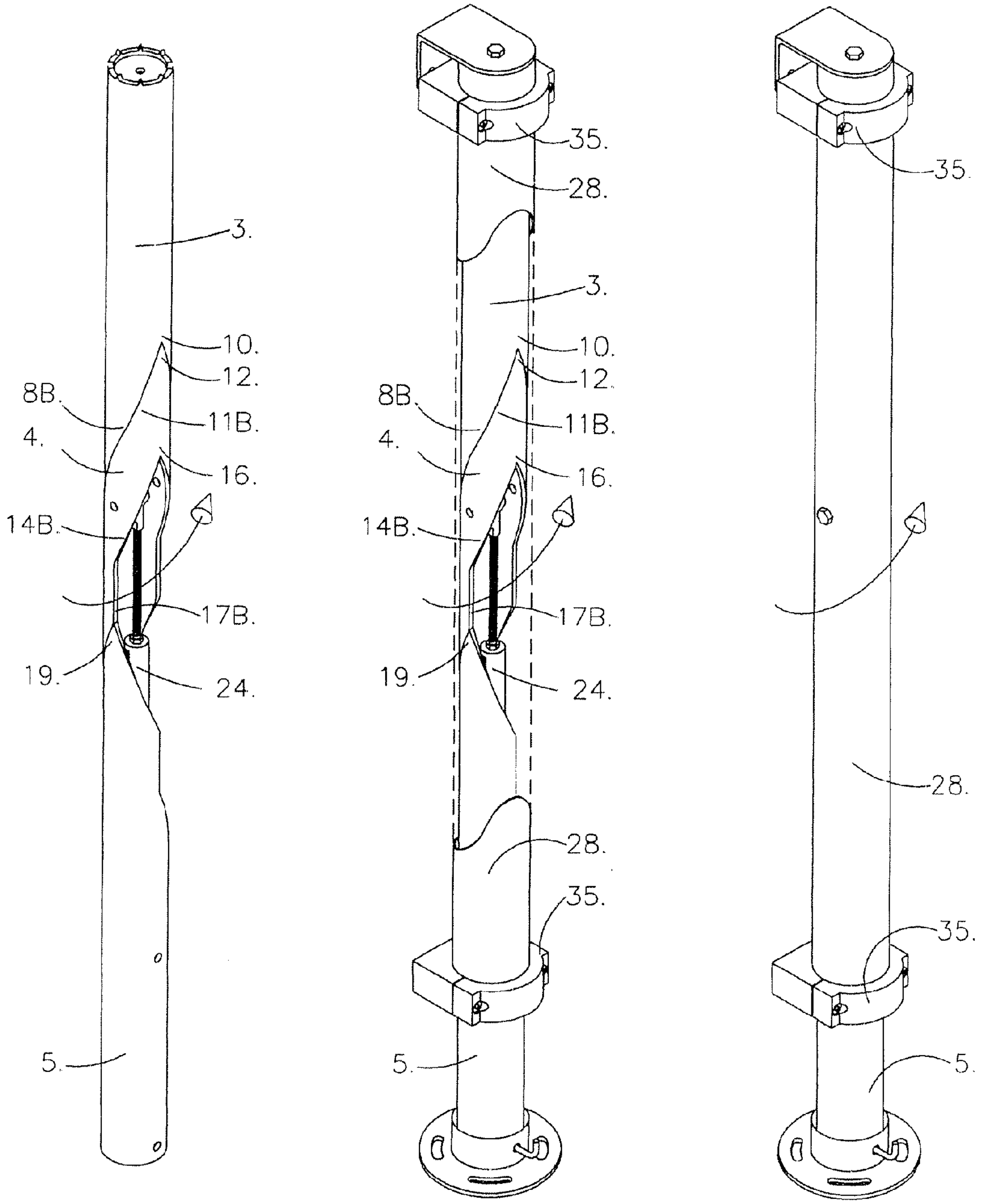
FIG. 9C is a perspective view illustrating a preferred embodiment of a left hand mount outward opening hinge simultaneously rising and turning as the hinge opens. The hinge is shown first without a sleeve, then with the sleeve shown cut-away, and finally with the sleeve intact.
Figure 9D:
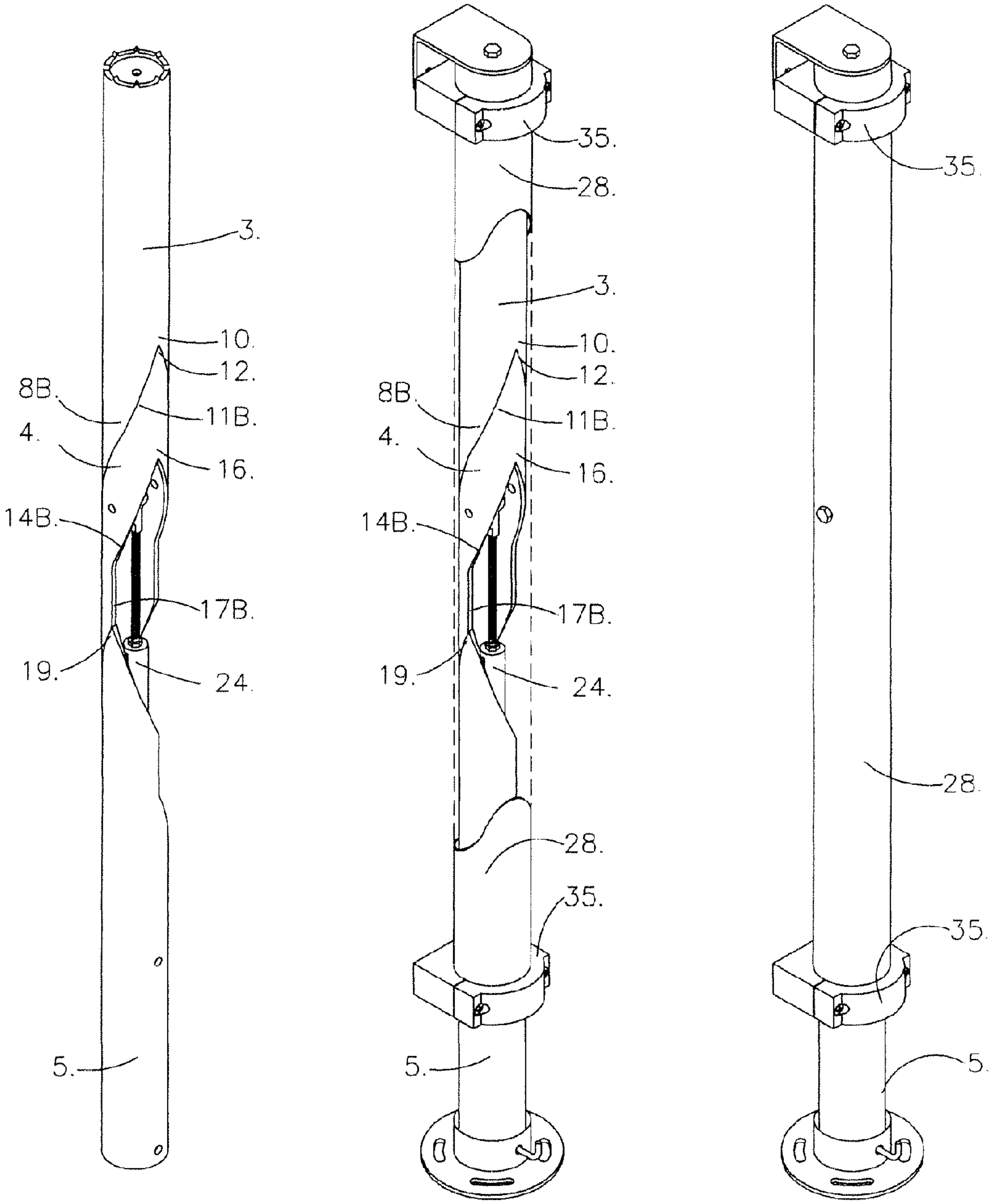
FIG. 9D is a perspective view illustrating a preferred embodiment of a left hand mount outward opening hinge in the open position. The hinge is shown first without a sleeve, then with the sleeve shown cut-away, and finally with the sleeve intact.
Figure 9E:
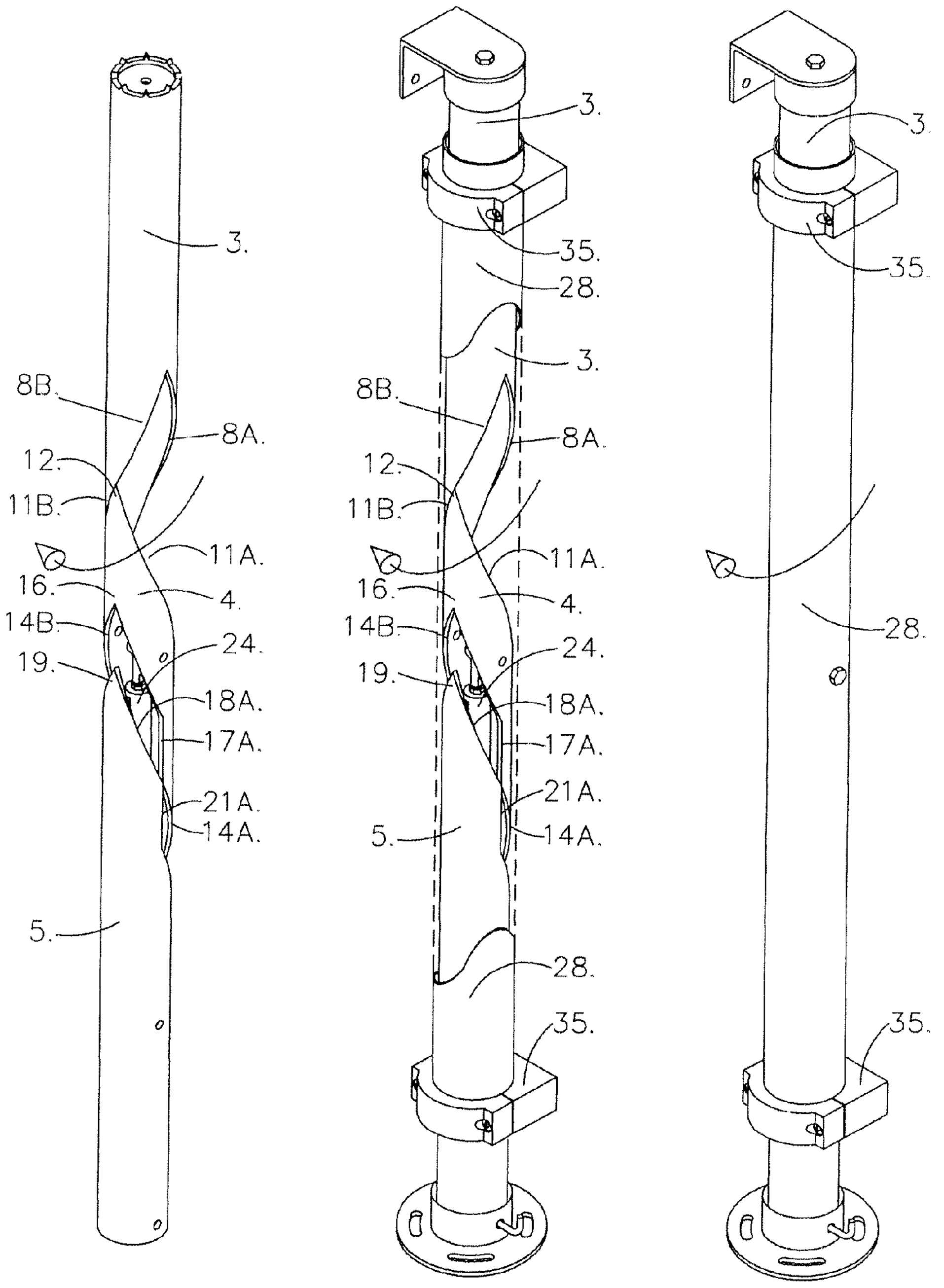
FIG. 9E is a perspective view illustrating a preferred embodiment of a left hand mount outward opening hinge simultaneously descending and turning as the hinge closes. The hinge is shown first without a sleeve, then with the sleeve shown cut-away, and finally with the sleeve intact.
Figure 9F:
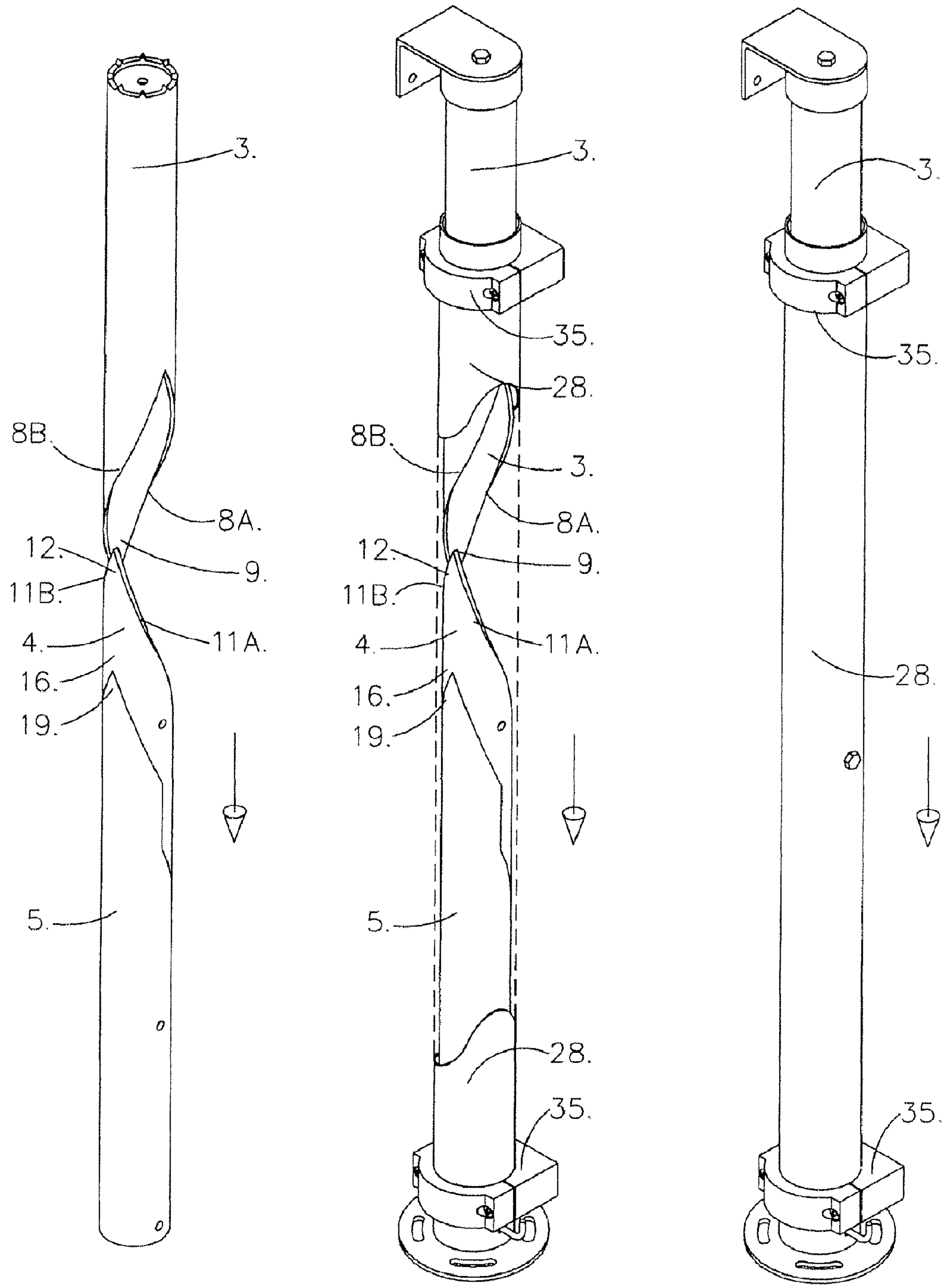
FIG. 9F is a perspective view illustrating a preferred embodiment of a left hand mount outward opening hinge descending back into the closed position. The hinge is shown first without a sleeve, then with the sleeve shown cut-away, and finally with the sleeve intact.
Figure 10A:
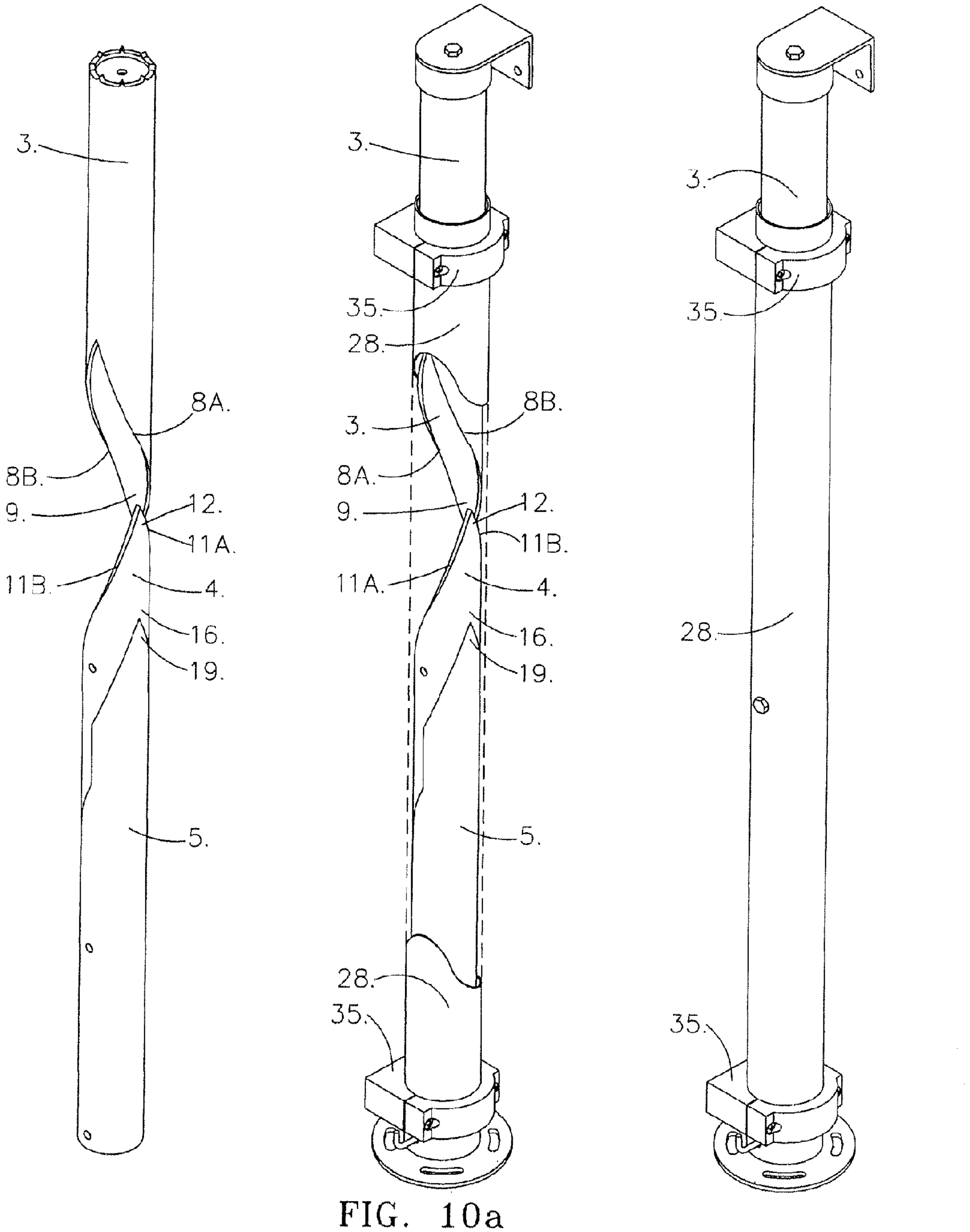
FIG. 10A is a perspective view illustrating a preferred embodiment of a right hand mount outward opening hinge in the closed position. The hinge is shown first without a sleeve, then with the sleeve shown cut-away, and finally with the sleeve intact.
Figure 10B:
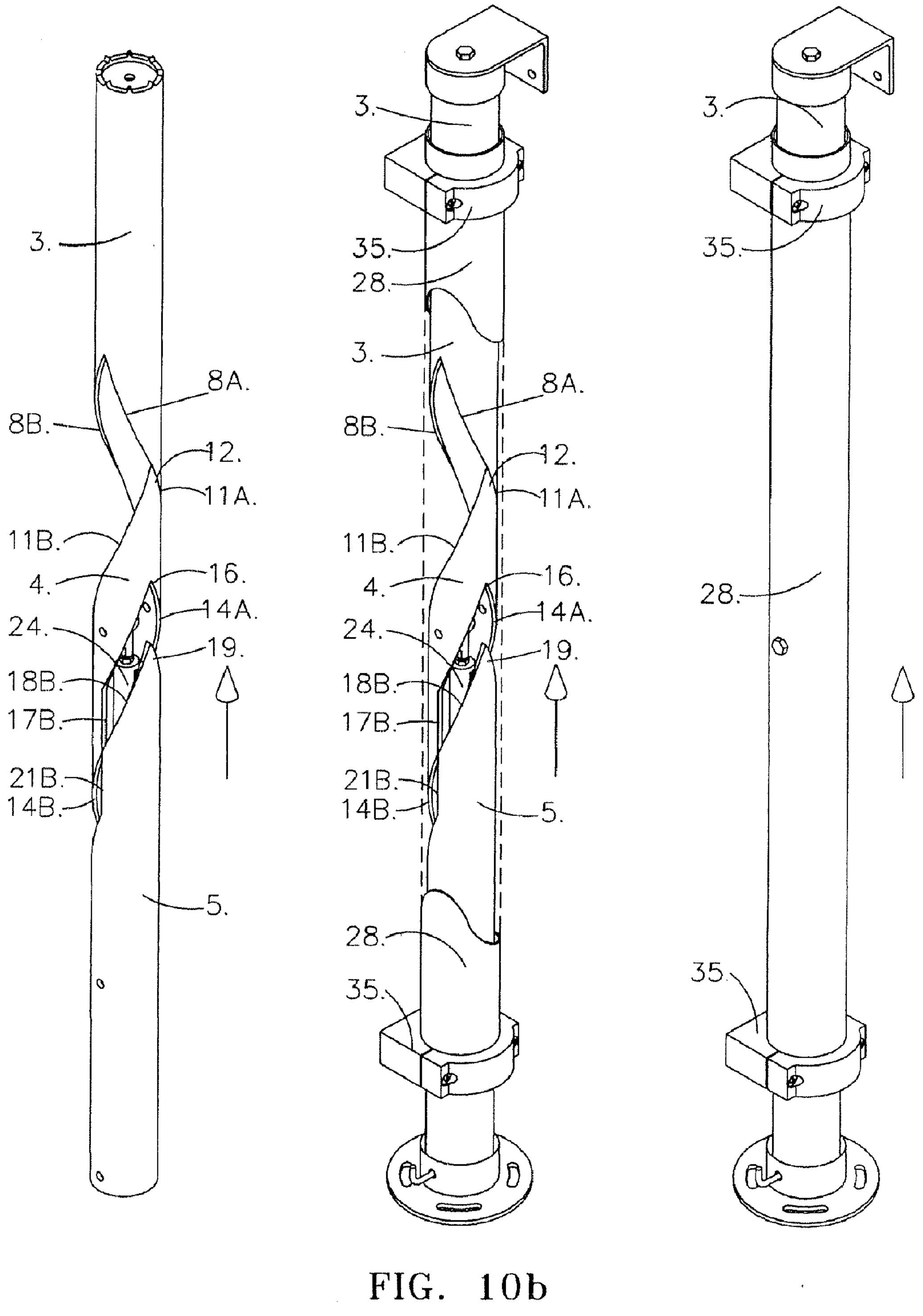
FIG. 10B is a perspective view illustrating a preferred embodiment of a right hand mount outward opening hinge rising vertically out of the closed position. The hinge is shown first without a sleeve, then with the sleeve shown cut-away, and finally with the sleeve intact.
Figure 10C:
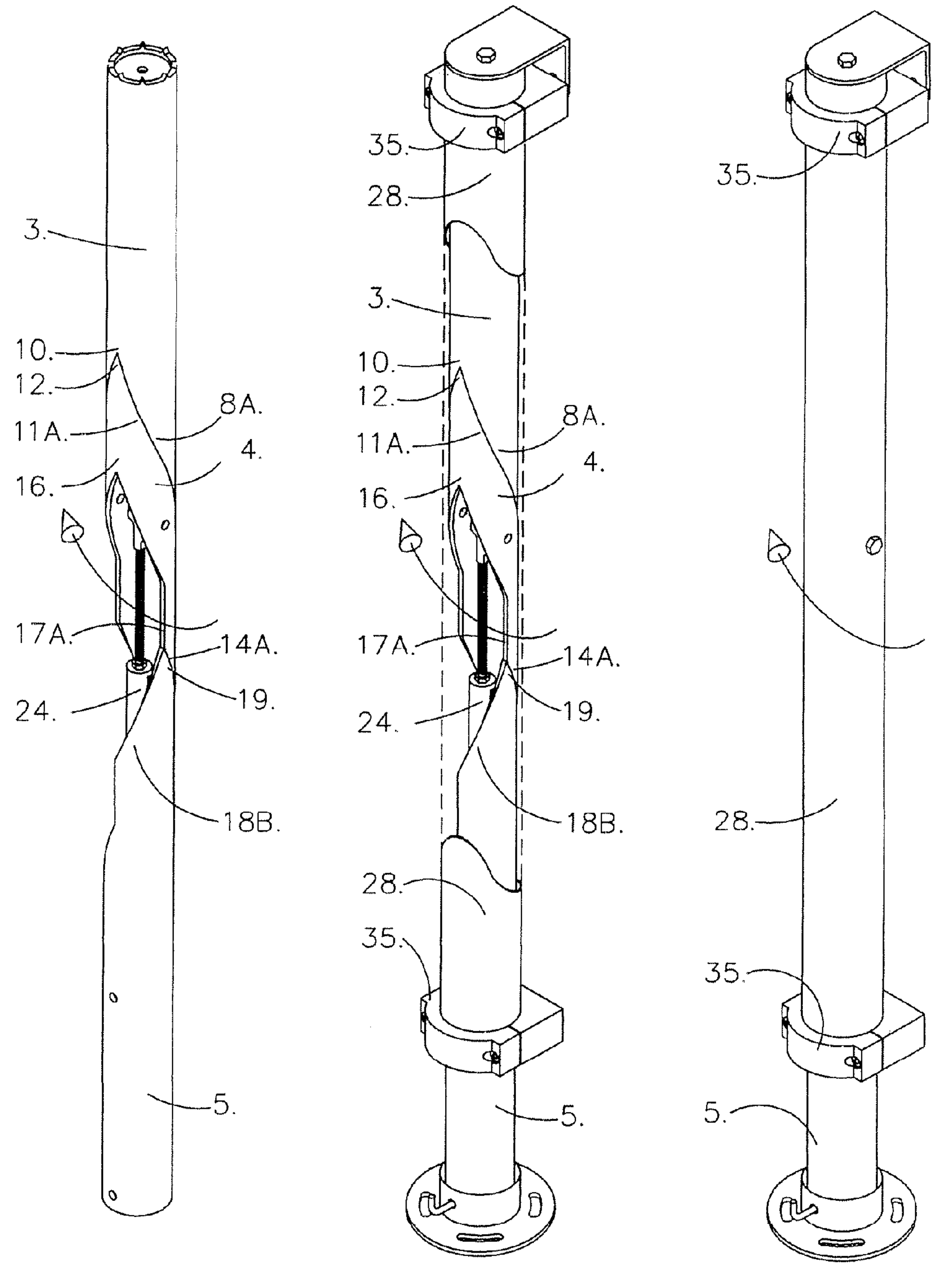
FIG. 10C is a perspective view illustrating a preferred embodiment of a right hand mount outward opening hinge simultaneously rising and turning as the hinge opens. The hinge is shown first without a sleeve, then with the sleeve shown cut-away, and finally with the sleeve intact.
Figure 10D:
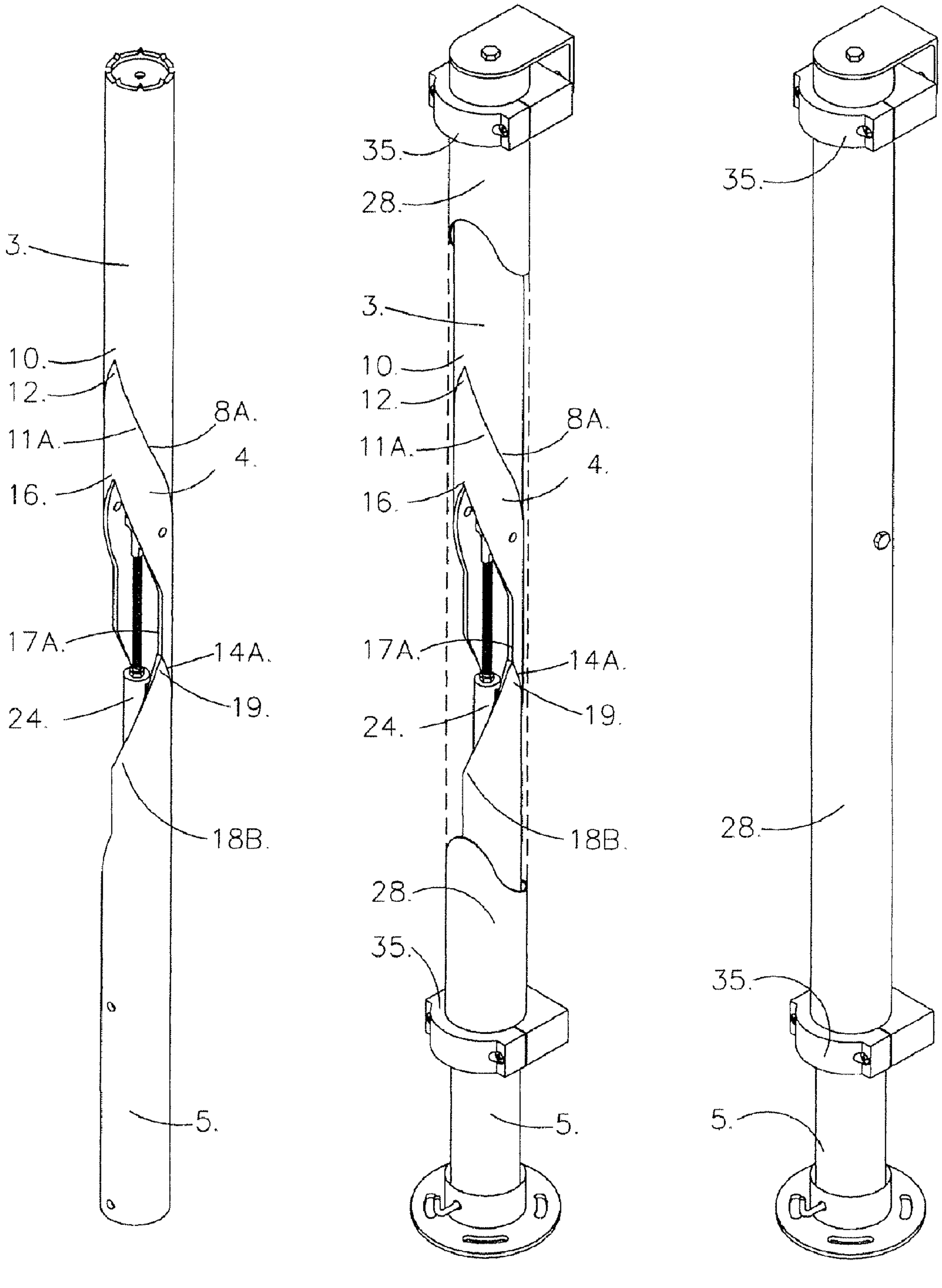
FIG. 10D is a perspective view illustrating a preferred embodiment of a right hand mount outward opening hinge in the open position. The hinge is shown first without a sleeve, then with the sleeve shown cut-away, and finally with the sleeve intact.
Figure 10E:
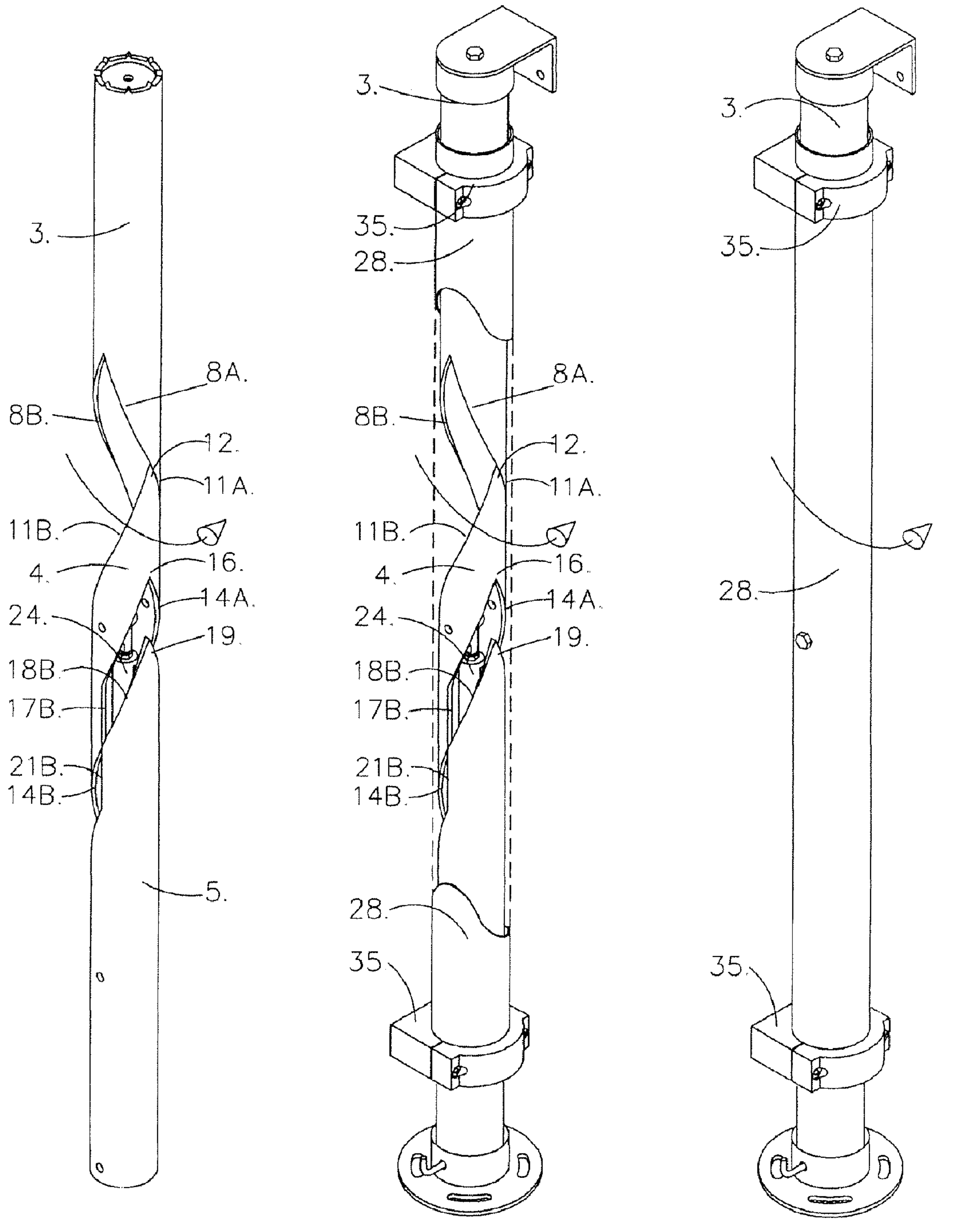
FIG. 10E is a perspective view illustrating a preferred embodiment of a right hand mount outward opening hinge simultaneously descending and turning as the hinge closes. The hinge is shown first without a sleeve, then with the sleeve shown cut-away, and finally with the sleeve intact.
Figure 10F:
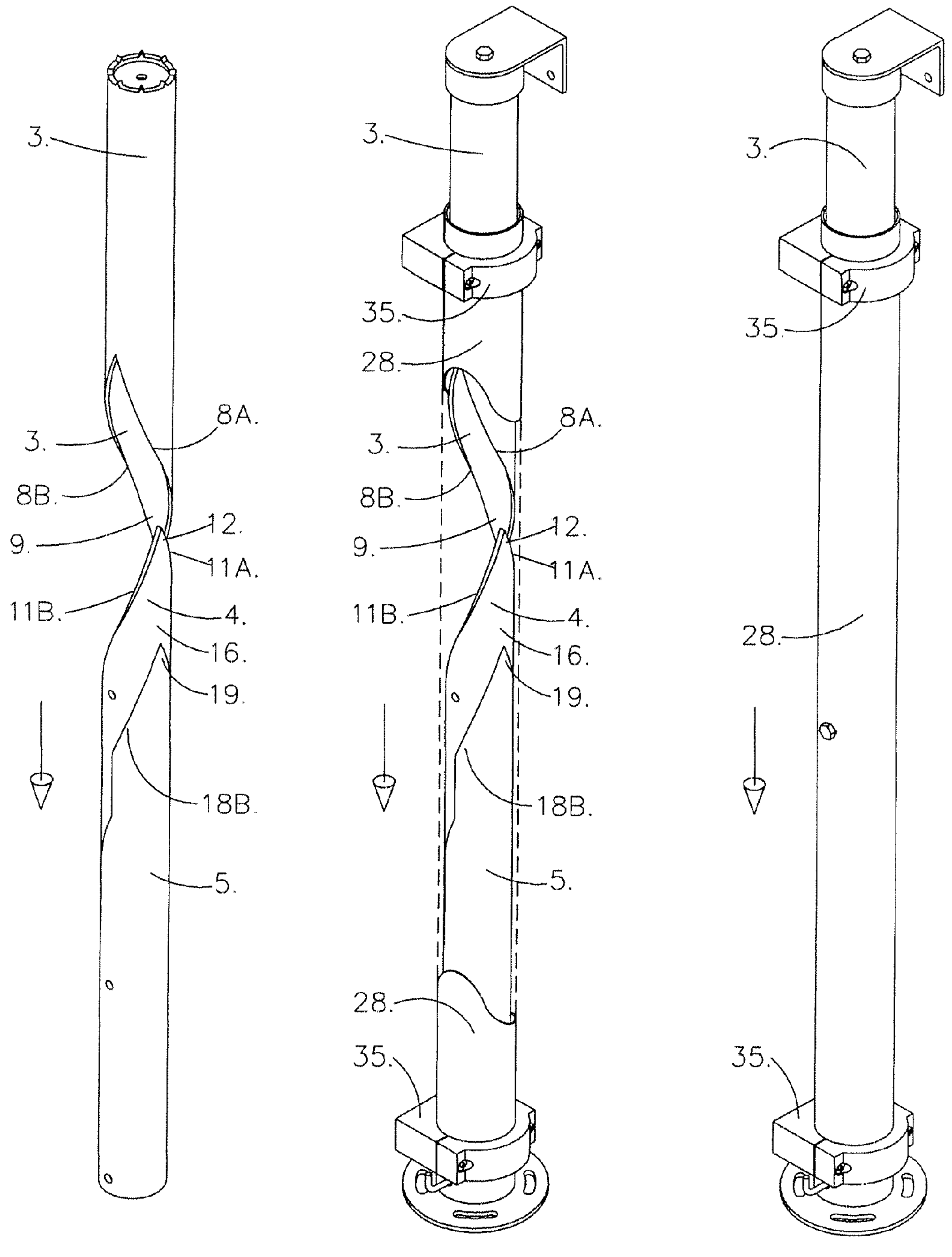
FIG. 10F is a perspective view illustrating a preferred embodiment of a right hand mount outward opening hinge descending back into the closed position. The hinge is shown first without a sleeve, then with the sleeve shown cut-away, and finally with the sleeve intact.
Figure 11A:
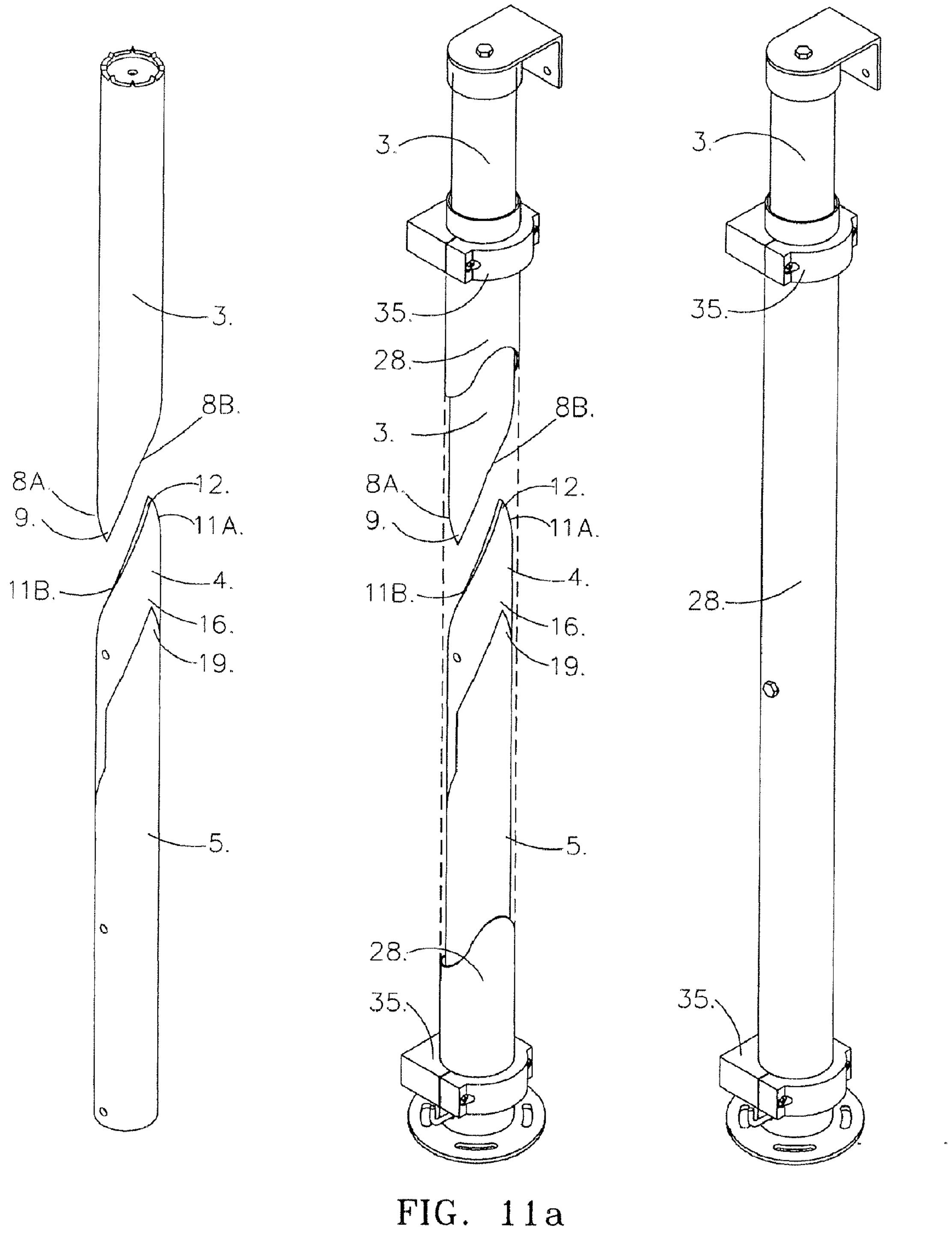
FIG. 11A is a perspective view illustrating a preferred embodiment of a right hand mount inward opening hinge in the closed position. The hinge is shown first without a sleeve, then with the sleeve shown cut-away, and finally with the sleeve intact.
Figure 11B:
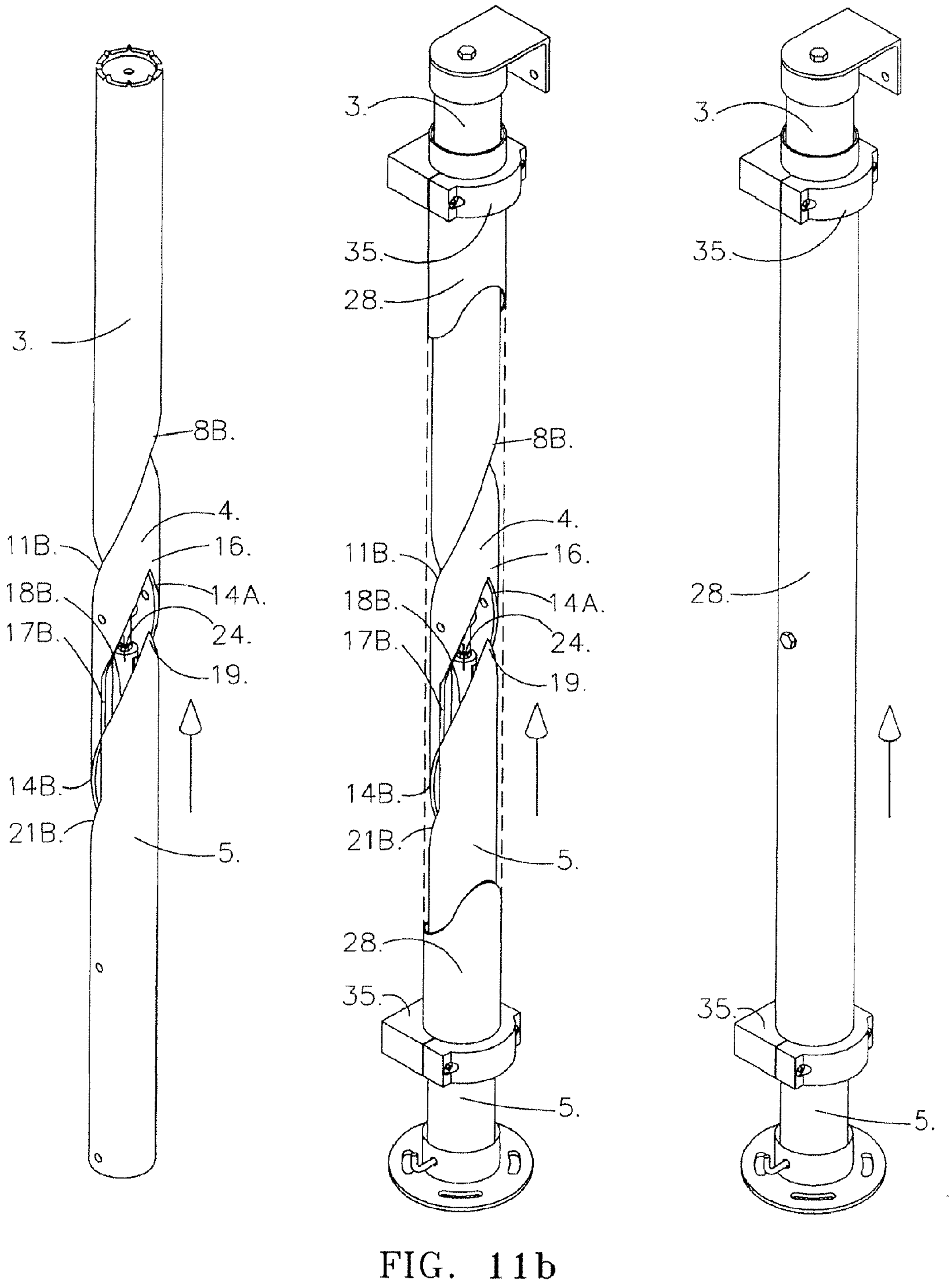
FIG. 11B is a perspective view illustrating a preferred embodiment of a right hand mount inward opening hinge rising vertically out of the closed position. The hinge is shown first without a sleeve, then with the sleeve shown cut-away, and finally with the sleeve intact.
Figure 11C:
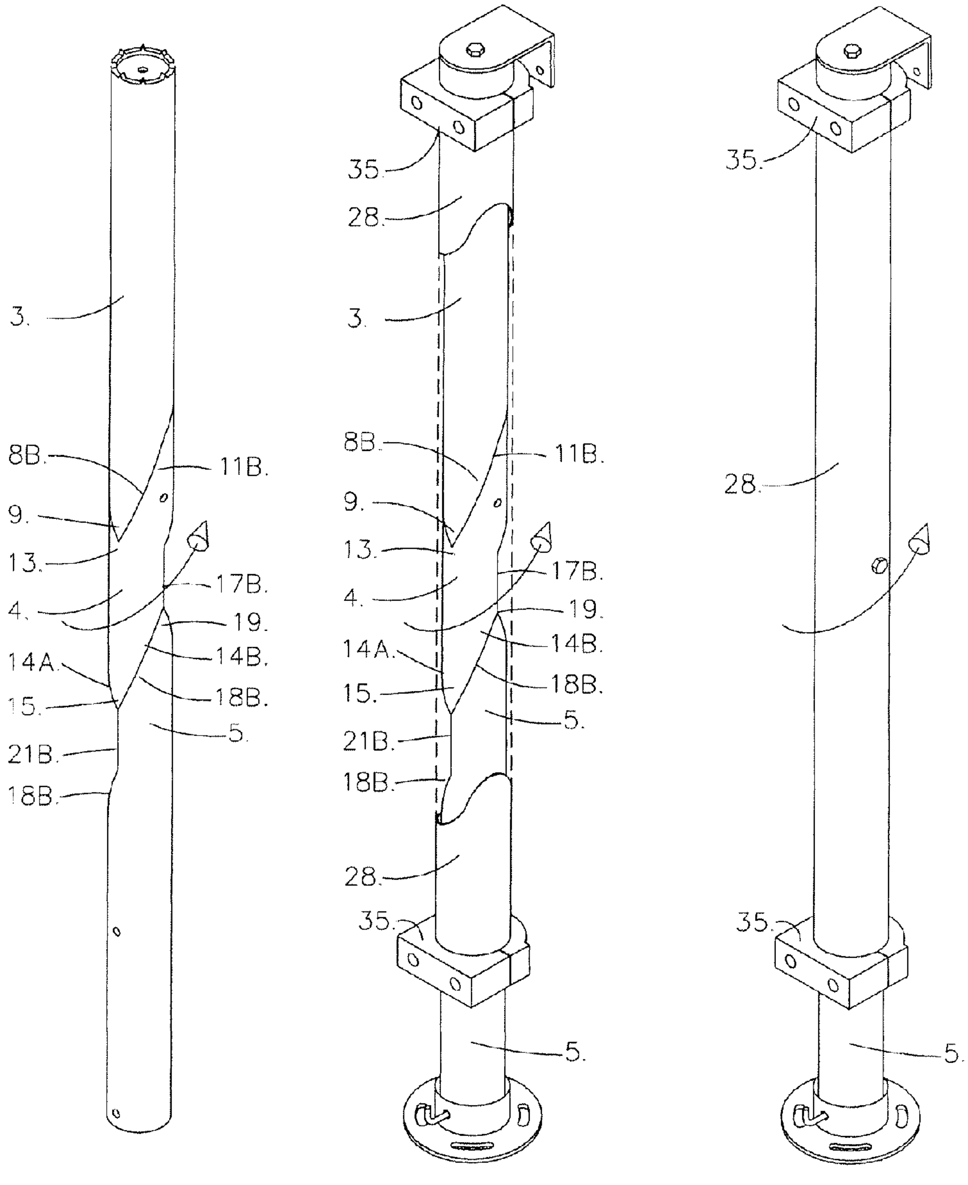
FIG. 11C is a perspective view illustrating a preferred embodiment of a right hand mount inward opening hinge simultaneously rising and turning as the hinge opens. The hinge is shown first without a sleeve, then with the sleeve shown cut-away, and finally with the sleeve intact.
Figure 11D:
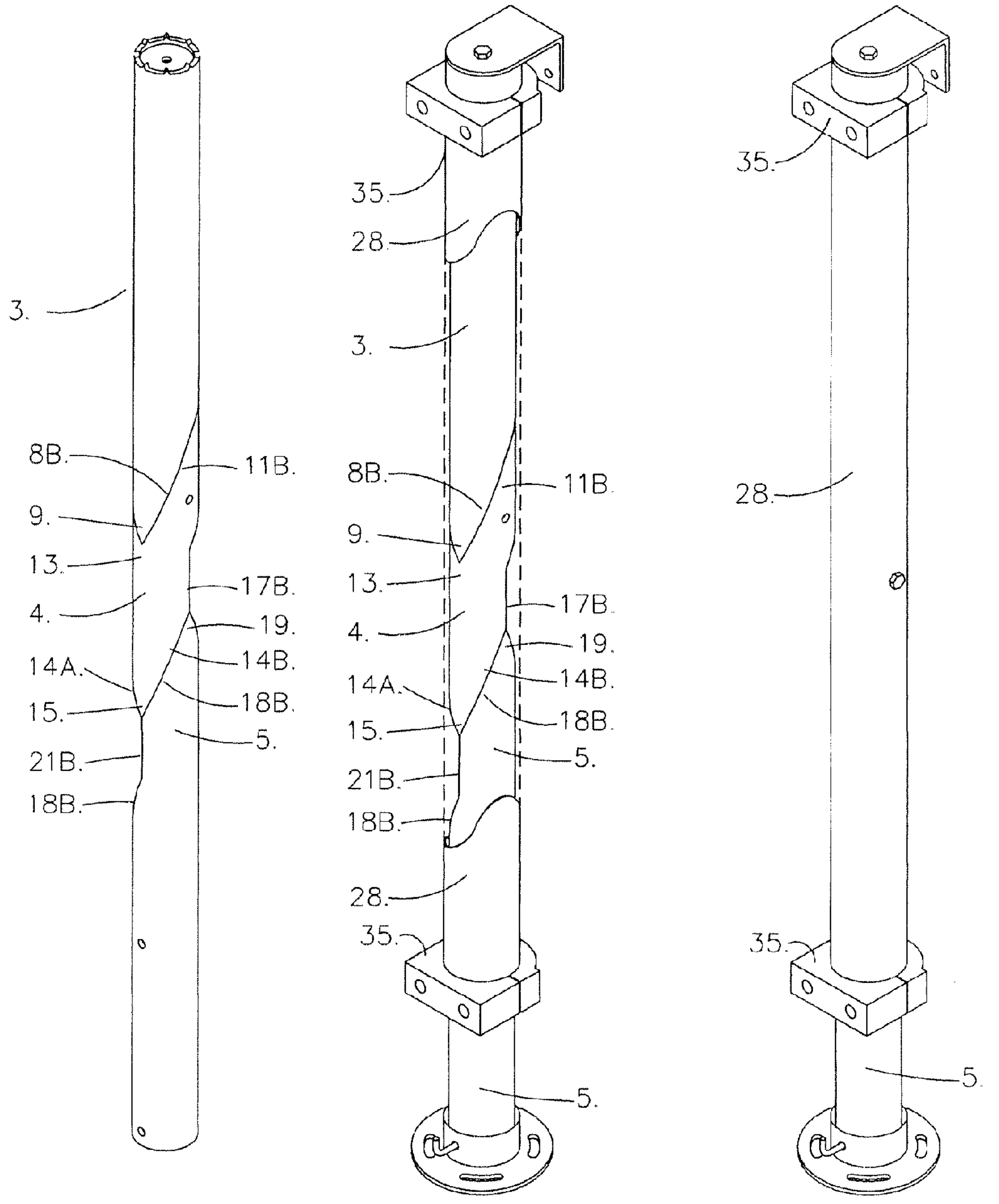
FIG. 11D is a perspective view illustrating a preferred embodiment of a right hand mount inward opening hinge in the open position. The hinge is shown first without a sleeve, then with the sleeve shown cut-away, and finally with the sleeve intact.
Figure 11E:
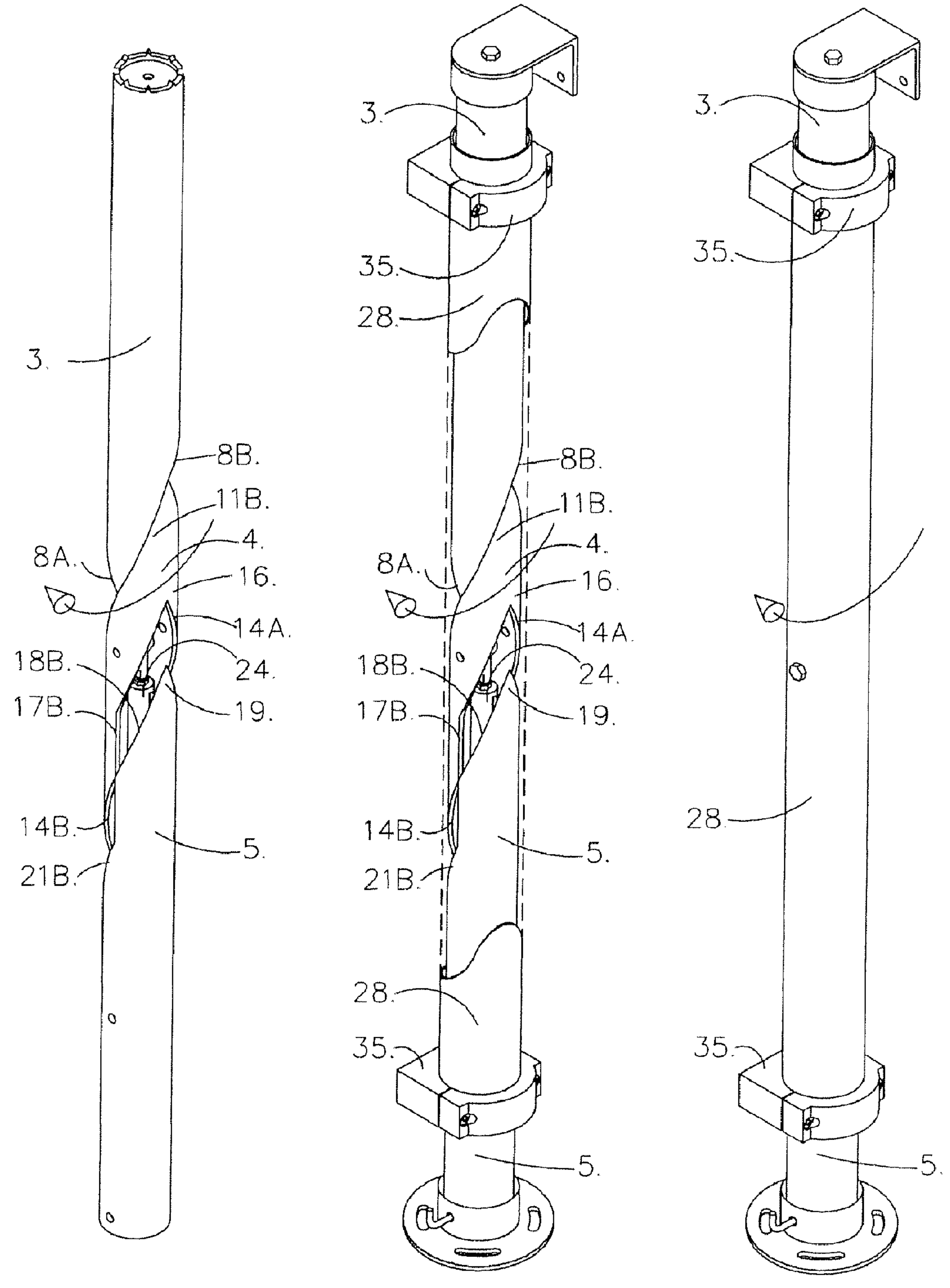
FIG. 11E is a perspective view illustrating a preferred embodiment of a right hand mount inward opening hinge simultaneously descending and turning as the hinge closes. The hinge is shown first without a sleeve, then with the sleeve shown cut-away, and finally with the sleeve intact.
Figure 11F:
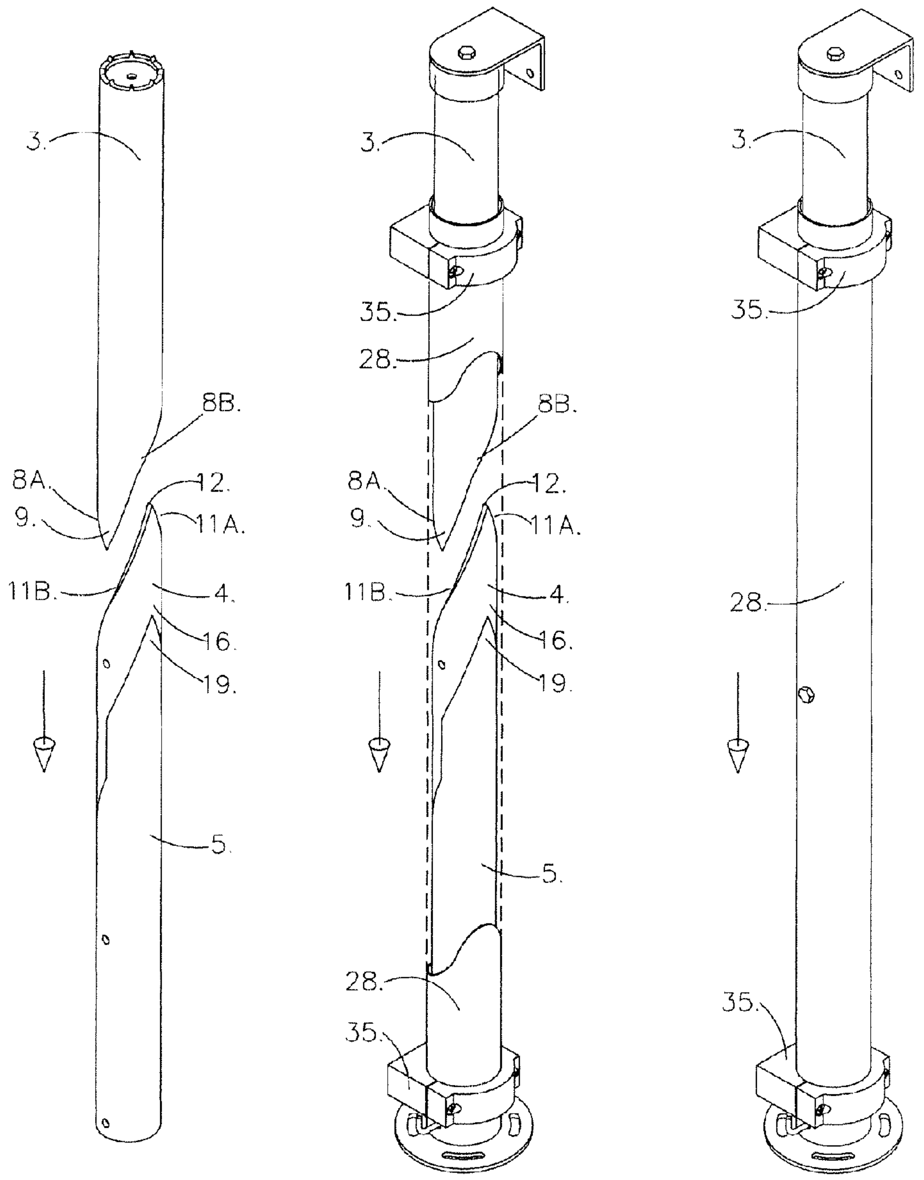
FIG. 11F is a perspective view illustrating a preferred embodiment of a right hand mount inward opening hinge descending back into the closed position. The hinge is shown first without a sleeve, then with the sleeve shown cut-away, and finally with the sleeve intact.

The preferred embodiment of the invention comprises a gate 1 mounted on an automatic hinge 2 configured to simultaneously lift and rotate gate 1. In the preferred embodiment, hinge 2 is comprised of three primary components: an upper or left hand section 3; a central section 4; and a lower or right hand section 5. Lower section 5 and upper section 3 are preferably fixed in place, typically by mounting them to a gate post 7. Upper section 3 is has a lower or interior edge 8. In the preferred embodiment, lower edge 8 of upper section 3 is comprised of two mirror image halves, 8A and 8B. Halves 8A and 8B begin at a common lower or inner point 9 and diverge upward, meeting one hundred eighty degrees away on the other side of upper section 3 at upper or outer point 10. The length of the vertical distance between lower point 9 and upper point 10 will be determined by the distance the gate designer desires gate 1 to rise during its rotation.

Central section 4 also has an upper or left hand edge 11. Upper edge 11 of central section 4 will mirror lower edge 8 of upper section 3. Upper edge 11 has two halves 11A and 11B. Halves 11A and 11B will begin at a common upper or outer point 12 and diverge downward until they meet one hundred eighty degrees away at common lower or inner point 13.

Central section 4 is also provided with a lower or right hand edge 14. Like upper edge 11, lower edge 14 also has two halves 14A and 14B. Halves 14A and 14B begin at a common lower or inner point 15 and diverge upward to a common upper or outer point 16. However, between lower point 15 and upper point 16, each half 14A, 14B contains a vertical or linear break 17A, 17B.

Lower section 5 has an upper or interior edge 18. Upper edge 18 of lower section 5 will mirror lower edge 14 of central section 4. Upper edge 18 has two halves 18A and 18B. Halves 18A and 18B will begin at a common upper or outer point 19 and diverge downward until they meet one hundred eighty degrees away at common lower or inner point 20. Like lower edge 14 of central section 4, each half 18A, 18B of upper edge 18 contains a vertical or linear break 21A, 21B between lower point 20 and upper point 19.

Gate 1 has a closed position 22 and an open position 23. In closed position 22, lower edge 14 of central section 4 will rest upon upper edge of 18 of lower section 5 and vertical breaks 17A, 17B will be aligned with their counterparts, 21A, 21B.

Gate 1 is preferably provided with a lift or drive 24 configured to raise and lower central section 4 substantially vertically. In one preferred embodiment, lift 24 comprises a threaded shaft 25 configured to raise and lower central section 4. Suitable threaded shaft lifts include ball screw actuators such as those available from Motion Systems of 600 Industrial Way West; Eatontown, N.J. In another preferred embodiment, lift 24 comprises an hydraulic cylinder 26 that raises and lowers central section 4. Suitable hydraulic cylinder lifts and associated hydraulic pump packs include those available from Oildyne Products of 5520 Highway 169 North; Minneapolis, Minn. and from Aurora Air Products of 231 Ceola Road; Aurora, Ill. Whatever version of lift or drive 24 is used, the connection between lift 24 and central section 4 should preferably allow central section 4 to rotate relative to lift 24 while being raised or lowered.

When lift 24 is activated, gate 1 will move out of closed position 22. Because of the alignment of vertical breaks 17A, 17B with vertical breaks 21A, 21B, central section 4 will initially move straight up without any rotation. If gate 1 is to be locked, a lock may be provided which gate 1 engages and disengages via this initial and, as will be subsequently described, terminal vertical motion. When a lock is used, it should preferably be configured to disengage at the same time that lift 24 is activated.

Central section 4 will rise vertically without rotation until upper edge 11 of central section 4 encounters lower edge 8 of upper section 3. At this point, vertical breaks 17A, 17B in central section 4 should preferably be clear of vertical breaks 21A, 21B in lower section 5.

Lift 24 will continue to push central section 4 upward. However, once contact is made between central section 4 and upper section 3, the interaction of lower edge 8 of upper section 3 and upper edge 11 of central section 4 will cause central section 4 to rotate as it rises. As central section 4 rotates, gate 1 will rotate as well. Thus, gate 1 will be simultaneously lifted and turned.

It will be appreciated that the point along lower edge 8 of upper section 3 where upper edge 11 of central section 4 makes contact will determine how far gate 1 may be rotated and lifted by hinge 2. Once upper point 19 of central section 4 reaches upper point 10 of upper section 3, no further lifting or rotation of gate 4 will be possible with the present mechanism. If upper edge 11 initially contacts lower edge 8 at the midpoint between lower point 9 and upper point 10, central section 4 and gate 1 will rotate about ninety degrees as central section is lifted through the remainder of its path. If upper edge 11 initially contacts lower edge 8 closer to lower point 9 than to upper point 10, central section 4 and gate 1 will rotate more than ninety degrees. Similarly, if upper edge 11 initially contacts lower edge 8 closer to upper point 10 than to lower point 9, central section 4 and gate 1 will rotate less than ninety degrees. Thus, the degree to which gate 1 rotates may be controlled by the alignment of central section 4 with upper section 3. The reader will also appreciate that the maximum amount gate 1 is opened may be limited by controlling the height reached by lift 24.

When gate 1 is used to control access to a roadway, it will typically be configured to open about ninety degrees. However, where gate 1 is used for other purposes, such as for example controlling livestock or their access to pastures, greater or lesser degrees of opening may be desired.

It will be further appreciated that the direction (clockwise vs. counterclockwise) in which central section 4 and gate 1 rotate will depend upon which side of lower point 9 upper edge 11 of central section 4 initially contacts lower edge 8 of upper section 3. Thus, if the user wishes a left hinged gate, viewed from the interior of the secured property, to open inward, central section 4 will be positioned so that upper edge 11 of central section 4 first encounters lower edge 8 of upper section 3 on the half 8A, 8B of lower edge 8 that is on the interior side of gate 1. Similarly, if it is desired that the same gate open outward, central section 4 will be positioned so that upper edge 11 of central section 4 first encounters lower edge 8 of upper section 3 on the half 8A, 8B of lower edge 8 that is on the exterior side of gate 1.

Hinge 2 can also be reversed for use on left and right hand hinged gates. If hinge 2 is installed as a left hand hinged inward opening gate, hinge 2 will be configured so that upper edge 11 of central section 4 first encounters lower edge 8 of upper section 3 on the half 8A, 8B of lower edge 8 that is on the interior side of gate 1. If hinge 2 is moved to a right hand hinged gate, and the same configuration is used, gate 1 will open outward. If an inwardly opening right hand hinged gate is desired, hinge 2 need only be configured so that upper edge 11 of central section 4 first encounters lower edge 8 of upper section 3 on the half 8A, 8B of lower edge 8 that is on the exterior side of gate 1.

The direction in which gate 1 opens may also be controlled by turning mounting brackets 35 (discussed below) one hundred eighty degrees. This will allow the gate 1 to be changed from inward opening to outward opening without changing the direction of rotation of hinge 2 from clockwise to counter-clockwise.

As will be appreciated by those skilled in the art, the reversibility of hinge 2 will provide distinct advantages. The installer does not have to either carry separate left and right mounting hardware to each installation or know whether a gate is to be a left hand or right hand gate before arriving at the job. Given the cost of many gate projects and especially custom gate projects as well as the remoteness of some gate installations, this can be a significant advantage, as a right hand or left hand error with prior art gates can result in costly and time consuming delays.

When the user desires to close gate 1, lift 24 will simply be operated in reverse. If central section 4 is not in contact with lower section 5 when lift 24 is reversed, gate 1 and central section 4 will descend linearly until lower edge 14 of central section 4 encounters upper edge 18 of lower section 5. However, in the preferred embodiment, central section 4 is configured so that lower edge 14 of central section 4 remains in contact with upper edge 18 of lower section 5 continuously as central section 5 is rising and turning along lower edge 8 of upper section 3. Thus, as soon as lift 24 is reversed and central section 4 begins to descend central section 4 will be in contact with lower section 5.

Lower edge 14 of central section 4 and upper edge 18 of lower section 5 will interact in substantially the same manner as upper edge 11 of central section 4 and lower edge 8 of upper section 3. As lift 24 lowers central section 4, lower edge 14 will encounter and ride along upper edge 18, causing central section 4 and gate 1 to rotate as they descend. Lower edge 14 and upper edge 18 are angled in the opposite direction from upper edge 11 and lower edge 8. Thus, central section 4 and gate 1 will rotate in the opposite direction upon descent as they did during ascent. Lower edge 14 and upper edge 18 should be angled to the same degree as lower edge 8 and upper edge 11, so that central section 4 and gate 1 will fall the same distance during their closing rotation as they rose during their opening rotation.

As lift 24 descends, central section 4 and gate 1 will rotate until vertical breaks 17A, 17B in lower edge 14 of central section 4 realign with vertical breaks 21A, 21B of upper edge 18 of lower section 5. When vertical breaks 17A, 17B are aligned with vertical breaks 21A, 21B, central section 4 and gate 1 will descend vertically without rotation as lift 24 continues to descend.

It will be appreciated that the total distance gate 1 rises will be determined by a combination of the length of vertical breaks 17A, 17B, 21A, 21B and the vertical distance between the point where upper edge 11 of central section 4 encounters lower edge 8 of upper section 3 and upper point 10 of lower edge 8 of upper section 3. Lower edge 14 of central section 4 and upper edge 18 of lower section 5 should be configured so that central section 4 and gate 1 will descend the same distance.

By configuring hinge 2 in the foregoing manner, hinge 2 will rotate and lower gate 1 through precisely the same path gate 1 took when it was opened. At the end of gate 1's closing rotation, gate 1 will be lowered back into closed position 22. If a lock is used with gate 1, gate 1 will preferably engage the lock upon its descent back into closed position 22.

In the preferred embodiment, hinge 2 is provided with a sleeve 28. Sleeve 28 will preferably comprise an exterior section 28A and an interior section 28B. In the preferred embodiment gate 1 is attached to sleeve 28 with mounting brackets 35. In turn, sleeve 28 is attached to central section 4. Thus, in the preferred embodiment, central section 4 is attached to gate 1 through sleeve 28 and brackets 35. The attachment between central section 4 and sleeve 28 will cause sleeve 28 and attached gate 1 to rotate and rise or fall as central section 4 turns and rises or falls. Sleeve 28 is preferably positioned over the upper section 3 and lower section 5. Sleeve 28 is configured to rise and fall on upper section 3 and lower section 4 as well as turn around them.

In the preferred embodiment interior section 28B of sleeve 28 preferably comprises an ultra high molecular weight plastic to facilitate (1) rotation of sleeve 28 around upper and lower sections 3, 5; (2) the rise and fall of sleeve 28 on upper and lower sections 3, 5; and (3) the prevention of movement among the internal components 3, 4, and 5 of the hinge 2, whereby the components may be kept in vertical or linear alignment with one another. Outer section 28A is preferably made of aluminum. It will serve to protect the interior components of hinge 2.

The components of hinge 2 and gate 1 may be made out of virtually any strong solid material, including a wide variety of plastics and metals. The particular materials selected will depend upon the requirements and aesthetics of the particular application. However, in many applications, the inventor prefers to use aluminum for the components of hinge 2. Particularly when gate 1 is intended to serve as a crash gate suitable for preventing intruders from driving through gate 1, it may be desirable to use steel for the components of hinge 2.

It will be appreciated that the simultaneous lift and rotate mechanism of hinge 2 and gate 1 provide substantial advantages. Gated drives often rise, fall or turn just past the gate. Additionally, some drives have curbs or other obstructions on their sides. Gates that swing flat—without a rise—may strike the rising drive, terrain, curb, or other obstruction. This can prevent them from opening completely. If a flat swinging gate is mounted higher to accommodate the obstructions, the gate will not sit flat when it is closed, compromising its security function. The rise and lift configuration of the preferred embodiment allows it to clear most such obstructions as it opens. Moreover, because the preferred embodiment is configured to descend and rotate simultaneously through the same path taken during the opening rotation, obstacles overcome during opening will not pose a problem during closing.

When hinge 2 is used to open and close gate 1, gate 1 and lift 24 are preferably configured to operate on a twenty-four volt system. This will make the use of back-up battery power convenient. As the reader will appreciate, having battery back-up power for gate 1 will allow ingress and egress to the secured property even when municipal electrical power fails.

In the preferred embodiment, gate 1 is provided with a circuit board 30 to govern the electrical systems of gate 1. Circuit board 30 is preferably provided with a rectifier configured to convert the one hundred ten volt alternating current common in U.S. municipal power lines to twenty-four volt direct current. Additionally, circuit board 30 will be configured to charge the back-up battery or batteries as needed.

Circuit board 30 is further configured to sense the torque exerted by gate 1 as reflected by increases in resistance. The torque exerted by gate 1 will increase if gate 1 strikes an object while opening or closing. Circuit board 30 is provided with a safety setting which will stop gate 1 if an increase in torque is detected during opening. The safety setting will also cause gate 1 to open if an increase in torque is detected during opening.

In the preferred embodiment, the safety device is deactivated in the last few centimeters of gate movement. As upper point 12 of upper edge 11 of central section 4 meets upper point 10 of lower edge 8 of upper section 3, central section 4 and upper section 3 will "nest." This is desirable in that when gate 1 is open, it will be most steady in this position. However, when central section 4 and upper section 3 nest, an increase in torque may be detected by the safety setting. Therefore, a limit switch is provided in the preferred embodiment to deactivate the safety setting in the last few centimeters of the motion of gate 1. The limit switch is provided on lift 24. As lift 24 nears its maximum extension, lift 24 will trigger the limit switch which will deactivate the safety setting. As lift 24 begins to descend, the limit switch will be triggered again, reactivating the safety setting. Suitable limit switches are available from Elite Products of 25741 Commercentre Drive; Lake Forest, Calif. 92630.

In the preferred embodiment, photo beams and receptors, such as the kind commonly used in garage doors, may be provided to detect if anything is in the path of gate 1 and to override any command to open or close gate 1.

Circuit board 30 may also be provided with a timer to automatically close gate 1 after a set period. Circuit board 30 is also preferably provided with a control setting that regulates the speed of gate 1 as it closes. Typically, the control setting will allow the user to slow gate 1 to about one third of its normal speed during the final third of its closing passage. This will prevent gate 1 from "closing hard" and potentially damaging gate 1 or such objects as may become positioned between gate 1 and, for example, the lock. Suitable circuit boards 30 may be obtained from Falco Electric of 1335 Winding Ridge; Colorado Springs, Colo.

Although the preferred embodiment of the invention has been described in terms of a gate, the invention may be used in connection with any device that should open and close while simultaneously rising or falling. Examples could include doors, windows, valve gates, or other like devices. Additionally, it will be appreciated that while the present invention has been described as having a vertical configuration, hinge 2 could be positioned horizontally or in any other configuration and operate in the same manner.

What is claimed is:

1. An automatic hinge comprising:
- a fixed left hand section, said left hand section having an arcuate interior edge extending from an outer point to an inner point;
- a fixed right hand section, said right hand section having an arcuate interior edge extending from an outer point to an inner point;
- a rotatable central section in substantial linear alignment with said left hand and right hand sections, said central section having an arcuate left hand edge extending from an outer point to an inner point, said left hand edge of said central section configured to mate with said interior edge of said left hand section, said central section further having an arcuate right hand edge extending from an inner point to an outer point, said right hand edge of said central section configured to mate with said interior edge of said right hand section;
- a drive configured to move said central section between said right hand section and said left hand section whereby said central section will rotate as said arcuate left hand edge of said central section engages said arcuate interior edge of said left hand section and whereby said central section will also rotate as said arcuate right hand edge of said central section engages said interior edge of said right hand section and;
- a sleeve positioned over and attached to said central section, positioned over said left hand section, and positioned over said right hand section, said sleeve configured to move linearly and rotate with said central section, said sleeve further configured to hold said left hand section, said right hand section, and said central section in linear alignment.

2. An automatic hinge according to claim 1 wherein said central section is configured to rotate in a first direction when said left hand edge of said central section engages said interior edge of said left hand section and wherein said central section is configured to rotate in a second opposite direction when said right hand edge of said central section engages said interior edge of said right hand section.

3. An automatic hinge according to claim 1 having a closed position wherein said hinge is configurable to rotate out of said closed position in a clockwise or counterclockwise direction from a right hand mount and a left hand mount.

4. An automatic hinge according to claim 1 further comprising a gate operative attached to said central section, whereby said gate will move linearly and rotate with said central section.

5. An automatic hinge according to claim 1 wherein said right hand edge of said central section further comprises a linear break between said outer point and said inner point of said right hand edge of said central section and wherein said interior edge of said right hand section further comprises a linear break between said outer point and said inner point of said interior edge of said right hand section.

6. An automatic hinge according to claim 5 wherein said linear break of said central section and said linear break of said right hand section are configured to mate and wherein said linear breaks are sized to allow said central section to remain in constant contact with right hand section as said central section is driven into contact with said left hand section.

7. An automatic hinge comprising:
- a fixed upper section, said upper section having an arcuate lower edge extending from an upper point to a lower point;
- a fixed lower section, said lower section having an arcuate upper edge extending from a lower point to an upper point;
- a rotatable central section in substantial linear alignment with said upper and lower sections, said central section having an arcuate upper edge extending from an upper point to a lower point, said upper edge of said central section configured to mate with said lower edge of said upper section, said central section further having an arcuate lower edge extending from a lower point to an upper point, said lower edge of said central section configured to mate with said upper edge of said lower section;
- a lift configured to move said central section between said lower section and said upper section whereby said central section will rotate as said arcuate upper edge of said central section engages said arcuate lower edge of said upper section and whereby said central section will also rotate as said arcuate lower edge of said central section engages said upper edge of said lower section; and
- a sleeve positioned over and attached to said central section, positioned over said upper section, and positioned over said lower section, said sleeve configured to rise, fall, and rotate with said central section, said sleeve further configured to hold said upper section, said lower section, and said central section in vertical alignment.

8. An automatic hinge according to claim 7 wherein said central section is configured to rotate in a first direction when said upper edge of said central section engages said lower edge of said upper section and wherein said central section is configured to rotate in a second opposite direction when said lower edge of said central section engages said upper edge of said lower section.

9. An automatic hinge according to claim 7 wherein said lift comprises a hydraulic cylinder.

10. An automatic hinge according to claim 7 wherein said lift comprises a threaded shaft.

11. An automatic hinge according to claim 7 further comprising a gate operative attached to said central section, whereby said gate will rise, fall, and rotate as said central section rises, falls, or rotates.

12. An automatic hinge according to claim 7 wherein said lower edge of said central section further comprises a vertical break between said upper point and said lower point of said lower edge of said central section and wherein said upper edge of said lower section further comprises a vertical break between said upper point and said lower point of said upper edge of said lower section.

13. An automatic hinge according to claim 12 wherein said vertical break of said central section and said vertical break of said lower section are configured to mate and wherein said vertical breaks are sized to allow said central section to remain in constant contact with lower section as said central section is lifted into contact with said upper section.

14. An automatic hinge according to claim 1 having a closed position wherein said hinge is configurable to rotate out of said closed position in a clockwise or counterclockwise direction from a right hand mount and a left hand mount.

15. An automatic hinge according to claim 14 wherein:

(a) said lower edge of said upper section comprises an arcuate first half and an arcuate second half, said first half extending from said lower point of said lower edge of said upper section to said upper point of said lower edge of said upper section, said second half extending from said lower point of said lower edge of said upper section to said upper point of said lower edge of said upper section in a direction opposite the direction of said first half;

(b) said upper edge of said central section comprises an arcuate first half and an arcuate second half, said first half extending from said lower point of said upper edge of said central section to said upper point of said upper edge of said central section, said second half extending from said lower point of said upper edge of said central section to said upper point of said upper edge of said central section in a direction opposite the direction of said first half;

(c) said lower edge of said central section comprises an arcuate first half and an arcuate second half, said first half extending from said lower point of said lower edge of said central section to said upper point of said lower edge of said central section, said second half extending from said lower point of said lower edge of said central section to said upper point of said lower edge of said central section in a direction opposite the direction of said first half; and (d) said upper edge of said lower section comprises an arcuate first half and an arcuate second half, said first half extending from said lower point of said upper edge of said lower section to said upper point of said upper edge of said lower section, said second half extending from said lower point of said upper edge of said lower section to said upper point of said upper edge of said lower section in a direction opposite the direction of said first half.

16. An automatic hinge according to claim 15 wherein said first half of said lower edge of said central section further comprises a vertical break between said upper end and said lower end of said lower edge of said central section;

wherein said second half of said lower edge of said central section further comprises a vertical break between said upper end and said lower end of said lower edge of said central section;

wherein said first half of said upper edge of said lower section further comprises a vertical break between said upper end and said lower end of said upper edge of said lower section; and wherein said second half of said upper edge of said lower section further comprises a vertical break between said upper end and said lower end of said upper edge of said lower section.

* * * * *